US012149727B2

(12) United States Patent
Paluri et al.

(10) Patent No.: US 12,149,727 B2
(45) Date of Patent: *Nov. 19, 2024

(54) IMAGE/VIDEO CODING METHOD AND APPARATUS BASED ON INTER PREDICTION

(71) Applicant: LG Electronics Inc., Seoul (KR)

(72) Inventors: Seethal Paluri, Seoul (KR); Hendry Hendry, Seoul (KR); Jie Zhao, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,070

(22) Filed: Jun. 9, 2023

(65) Prior Publication Data

US 2023/0328269 A1 Oct. 12, 2023

Related U.S. Application Data

(63) Continuation of application No. 17/839,118, filed on Jun. 13, 2022, now Pat. No. 11,716,484, which is a
(Continued)

(51) Int. Cl.
*H04N 19/105* (2014.01)
*H04N 19/109* (2014.01)
*H04N 19/132* (2014.01)
*H04N 19/137* (2014.01)
*H04N 19/159* (2014.01)
*H04N 19/172* (2014.01)
*H04N 19/174* (2014.01)
(Continued)

(52) U.S. Cl.
CPC ............ *H04N 19/51* (2014.11); *H04N 19/105* (2014.11); *H04N 19/109* (2014.11); *H04N 19/132* (2014.11); *H04N 19/137* (2014.11); *H04N 19/159* (2014.11); *H04N 19/172* (2014.11); *H04N 19/174* (2014.11); *H04N 19/176* (2014.11); *H04N 19/70* (2014.11)

(58) Field of Classification Search
CPC .. H04N 19/119; H04N 19/132; H04N 19/159; H04N 19/176
See application file for complete search history.

(56) References Cited

U.S. PATENT DOCUMENTS

2022/0248044 A1* 8/2022 Chen .................... H04N 19/136

FOREIGN PATENT DOCUMENTS

KR 101768865 B1 * 8/2017 ........... H04N 19/105

* cited by examiner

*Primary Examiner* — Hesham K Abouzahra
(74) *Attorney, Agent, or Firm* — Bryan Cave Leighton Paisner LLP

(57) ABSTRACT

A video decoding method performed by a video decoding apparatus, according to the present document, comprises the steps of: parsing a flag for weighted prediction from a bitstream; parsing a prediction weighted table syntax from the bitstream on the basis of the flag; generating prediction samples by performing weighted prediction on a current block within a current picture on the basis of the prediction weighted table syntax; and generating reconstructed samples for the current block on the basis of the prediction samples, wherein the prediction weighted table syntax may be parsed from a picture header or slice header of the bitstream on the basis of a value of the flag.

3 Claims, 11 Drawing Sheets

Related U.S. Application Data continuation of application No. PCT/KR2020/018131, filed on Dec. 11, 2020.

(60) Provisional application No. 62/950,964, filed on Dec. 20, 2019.

(51) Int. Cl.
*H04N 19/176* (2014.01)
*H04N 19/51* (2014.01)
*H04N 19/70* (2014.01)

IMAGE/VIDEO CODING METHOD AND APPARATUS BASED ON INTER PREDICTION

This application is a Continuation of U.S. patent application Ser. No. 17/839,118, filed Jun. 13, 2022, which is a Bypass Continuation Application based on PCT/KR2020/018131, filed on Dec. 11, 2020, which claims priority to Provisional Application No. 62/950,964, filed Dec. 20, 2019, the contents of which are all hereby incorporated by reference herein in their entirety.

BACKGROUND

Technical Field

The present disclosure relates to a method and an apparatus for encoding/decoding an image/video based on inter prediction.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

A technical subject of the present document is to provide a method and an apparatus for enhancing efficiency in video/image coding.

Another technical subject of the present document is to provide a method and an apparatus for efficiently performing inter prediction.

Still another technical subject of the present document is to provide a method and an apparatus for efficiently signaling a prediction weighted syntax table when performing inter prediction based on weighted prediction.

Yet another technical subject of the present document is to provide a method and an apparatus for reducing signaling overhead with respect to weighted prediction.

According to an embodiment of the present document, a video decoding method performed by a video decoding apparatus may include parsing a flag related to weighted prediction from a bitstream, parsing a prediction weighted table syntax from the bitstream based on the flag, generating prediction samples by performing weighted prediction on a current block in a current picture based on the prediction weighted table syntax, and generating reconstructed samples for the current block based on the prediction samples, wherein the prediction weighted table syntax may be parsed from a picture header or a slice header of the bitstream based on a value of the flag.

According to another embodiment of the present document, a video encoding method performed by a video encoding apparatus may include deriving motion information on a current block, generating prediction samples for the current block and prediction-related information by performing weighted prediction on the current block based on the motion information, generating residual information based on the prediction samples and original samples, and encoding image information comprising the prediction-related information and the residual information, wherein the prediction-related information may include a flag related to the weighted prediction and a prediction weighted table syntax, and the prediction weighted table syntax may be included in a picture header or a slice header of the image information based on a value of the flag.

According to still another embodiment of the present document, a computer-readable digital storage medium may include information to cause a video decoding apparatus to perform a video decoding method, and the video decoding method may include parsing a flag related to weighted prediction from image information, parsing a prediction weighted table syntax from the image information based on the flag, generating prediction samples by performing weighted prediction on a current block in a current picture based on the prediction weighted table syntax, and generating reconstructed samples for the current block based on the prediction samples, wherein the prediction weighted table syntax may be parsed from a picture header or a slice header of the image information based on a value of the flag.

According to an embodiment of the present document, it is possible to enhance overall video/image compression efficiency.

According to an embodiment of the present document, it is possible to efficiently perform inter prediction.

According to an embodiment of the present document, it is possible to efficiently signal a prediction weighted syntax table.

According to an embodiment of the present document, it is possible to reduce redundant signaling in transmitting information on weighted prediction.

DESCRIPTION OF EXEMPLARY EMBODIMENTS

Figure 1:
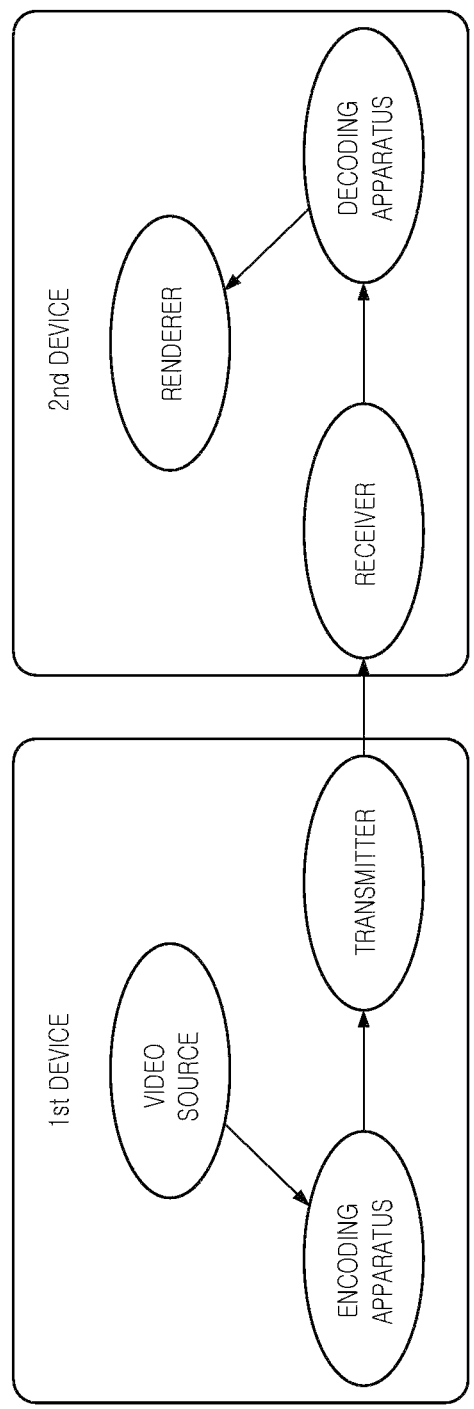
FIG. 1 schematically illustrates an example of a video/image coding system to which embodiments of the present document are applicable.

In the present document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present document should be interpreted to indicate "additionally or alternatively."

Further, the parentheses used in the present document may mean "for example". Specifically, in case that "prediction (intra prediction)" is expressed, it may be indicated t hat "intra prediction" is proposed as an example of "prediction". In other words, the ter m "prediction" in the present document is not limited to "intra prediction", and "intra pre diction" is proposed as an example of "prediction". Further, even in case that "prediction (i.e., intra prediction)" is expressed, it may be indicated that "intra prediction" is proposed as an example of "prediction".

The disclosure of the present document may be modified in various forms, and specific embodiments thereof will be described and illustrated in the drawings. The terms used in the present document are used to merely describe specific embodiments, but are not intended to limit the disclosed method in the present document. An expression of a singular number includes an expression of 'at least one', so long as it is clearly read differently. The terms such as "include" and "have" are intended to indicate that features, numbers, steps, operations, elements, components, or combinations thereof used in the document exist and it should be thus understood that the possibility of existence or addition of one or more different features, numbers, steps, operations, elements, components, or combinations thereof is not excluded.

In addition, each configuration of the drawings described in the present document is an independent illustration for explaining functions as features that are different from each other, and does not mean that each configuration is implemented by mutually different hardware or different software. For example, two or more of the configurations may be combined to form one configuration, and one configuration may also be divided into multiple configurations. Without departing from the gist of the disclosed method of the present document, embodiments in which configurations are combined and/or separated are included in the scope of the disclosure of the present document.

The present document relates to video/image coding. For example, a method/embodiment disclosed in the present document may be applied to a method disclosed in a versatile video coding (VVC) standard. In addition, the method/embodiment disclosed in the present document may be applied to a method disclosed in an essential video coding (EVC) standard, AOMedia Video 1 (AV1) standard, 2nd generation of audio video coding standard (AVS2), or a next-generation video/image coding standard (e.g., H.267, H.268, etc.).

Various embodiments related to video/image coding are presented in the present document, and the embodiments may be combined with each other unless otherwise stated.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture). A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture). A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In the present document, tile group and slice may be used interchangeably. For example, in the present document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. Cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

In the present document, technical features individually explained in one drawing may be individually implemented or simultaneously implemented.

Hereinafter, embodiments of the present document will be described in detail with reference to the accompanying drawings. In addition, like reference numerals are used to indicate like elements throughout the drawings, and the same descriptions on the like elements may be omitted.

FIG. 1 illustrates an example of a video/image coding system to which the embodiments of the present document may be applied.

Referring to FIG. 1, a video/image coding system may include a first device (a source device) and a second device (a reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be di splayed through the display.

Figure 2:
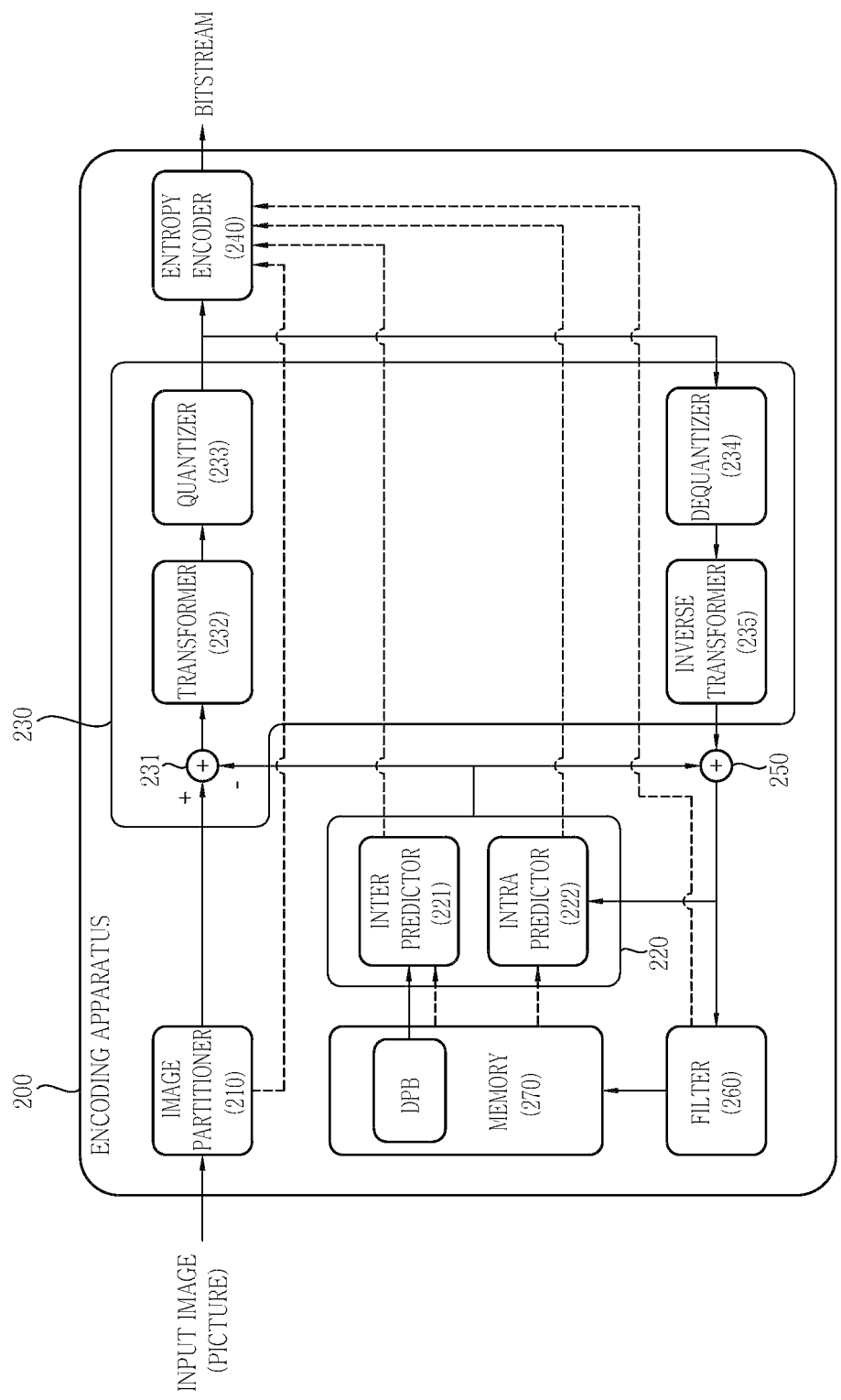
FIG. 2 is a diagram schematically illustrating a configuration of a video/image encoding apparatus to which the embodiments of the present document are applicable.

FIG. 2 is a diagram schematically illustrating the configuration of a video/image encoding apparatus to which the embodiments of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. In another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The encoding apparatus 200 may subtract the prediction signal (predicted block, prediction sample array) output from the inter predictor 221 or the intra predictor 222 from the input image signal (original block, original sample array) to generate a residual signal (residual block, residual sample array), and the generated residual signal is transmitted to the transformer 232. In this case, as illustrated, a unit for subtracting the prediction signal (prediction block, prediction sample array) from an input image signal (original block, original sample array) in the encoder 200 may be referred to as a subtractor 231. The predictor 220 may perform prediction on a processing target block (hereinafter, referred to as a current block) and generate a predicted block including prediction samples for the current block. The predictor 220 may determine whether intra prediction or inter prediction is applied in units of a current block or CU. The predictor 220 may generate various kinds of information on prediction, such as prediction mode information, and transmit the generated information to the entropy encoder 240, as is described below in the description of each prediction mode. The information on prediction may be encoded by the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods to be described below. For example, the predictor 220 may apply intra prediction or inter prediction for prediction of one block and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC basically performs prediction within the current picture, but may be performed similarly to inter prediction in that a reference block is derived within the current picture. That is, IBC may use at least one of the inter prediction techniques described in the present document. The palette mode may be viewed as an example of intra coding or intra prediction. When the palette mode is applied, a sample value in the picture may be signaled based on information on the palette table and the palette index.

The prediction signal generated by the predictor (including the inter predictor 221 and/or the intra predictor 222) may be used to generate a reconstructed signal or may be used to generate a residual signal.

The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, GBT refers to transformation obtained from a graph when expressing relationship information between pixels in the graph. CNT refers to transformation obtained based on a prediction signal generated using all previously reconstructed pixels. Also, the transformation process may be applied to a block of pixels having the same size as a square or may be applied to a block of a variable size that is not a square.

The quantizer 233 quantizes the transform coefficients and transmits the same to the entropy encoder 240, and the entropy encoder 240 encodes the quantized signal (information on the quantized transform coefficients) and outputs the encoded signal as a bitstream. Information on the quantized transform coefficients may be referred to as residual information. The quantizer 233 may rearrange the quantized transform coefficients in the block form into a one-dimensional vector form based on a coefficient scan order and may generate information on the transform coefficients based on the quantized transform coefficients in the one-dimensional vector form.

The entropy encoder 240 may perform various encoding methods such as, for example, exponential Golomb, context-adaptive variable length coding (CAVLC), and context-adaptive binary arithmetic coding (CABAC). The entropy encoder 240 may encode information necessary for video/image reconstruction (e.g., values of syntax elements, etc.) other than the quantized transform coefficients together or separately. Encoded information (e.g., encoded video/image information) may be transmitted or stored in units of a network abstraction layer (NAL) unit in the form of a bitstream. The video/image information may further include information on various parameter sets, such as an adaptation parameter set (APS), a picture parameter set (PPS), a sequence parameter set (SPS), or a video parameter set (VPS). Also, the video/image information may further include general constraint information. In the present document, information and/or syntax elements transmitted/signaled from the encoding apparatus to the decoding apparatus may be included in video/image information. The video/image information may be encoded through the encoding procedure described above and included in the bitstream. The bitstream may be transmitted through a network or may be stored in a digital storage medium. Here, the network may include a broadcasting network and/or a communication network, and the digital storage medium may include various storage media such as USB, SD, CD, DVD, Blu-ray, HDD, and SSD. A transmitting unit (not shown) and/or a storing unit (not shown) for transmitting or storing a signal output from the entropy encoder 240 may be configured as internal/external elements of the encoding apparatus 200, or the transmitting unit may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transform unit 235. The adder 250 may add the reconstructed residual signal to the prediction signal output from the inter predictor 221 or the intra predictor 222 to generate a reconstructed signal (reconstructed picture, reconstructed block, reconstructed sample array). When there is no residual for the processing target block, such as when the skip mode is applied, the predicted block may be used as a reconstructed block. The adder 250 may be referred to as a restoration unit or a restoration block generator. The generated reconstructed signal may be used for intra prediction of a next processing target block in the current picture, or may be used for inter prediction of the next picture after being filtered as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset, an adaptive loop filter, a bilateral filter, and the like. The filter 260 may generate various kinds of information related to the filtering, and transfer the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
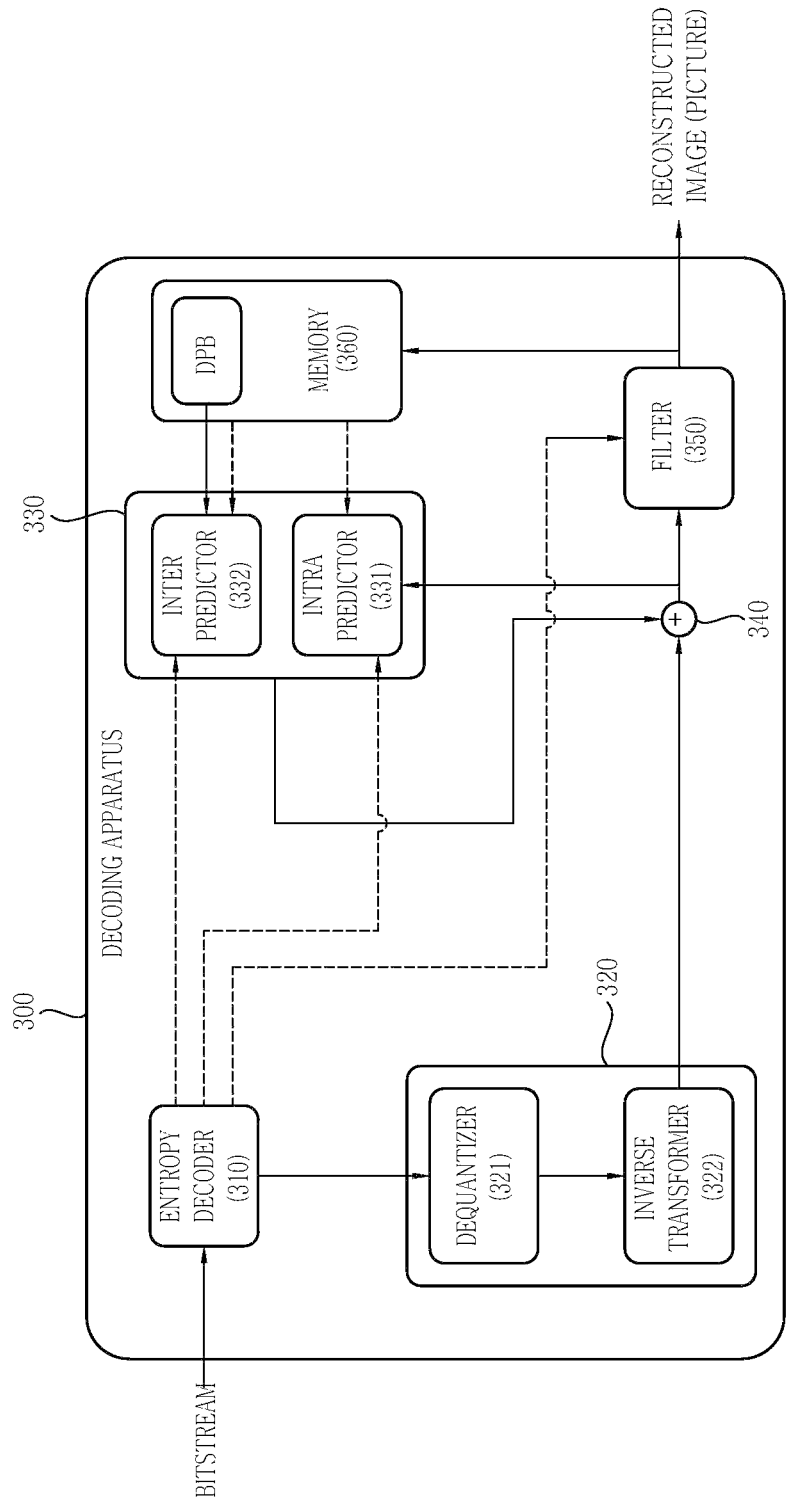
FIG. 3 is a diagram schematically illustrating a configuration of a video/image decoding apparatus to which the embodiments of the present document are applicable.

FIG. 3 is a diagram for schematically explaining the configuration of a video/image decoding apparatus to which the embodiments of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present document may be decoded may decode the decoding procedure and obtained from the bitstream. For example, the entropy decoder 310 decodes the information in the bitstream based on a coding method such as exponential Golomb coding, context-adaptive variable length coding (CAVLC), or context-adaptive arithmetic coding (CABAC), and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (inter predictor 332 and intra predictor 331), and residual values on which the entropy decoding has been performed in the entropy decoder 310, that is, the quantized transform coefficients and related parameter information, may be input to the residual processor 320.

The residual processor 320 may derive a residual signal (residual block, residual samples, or residual sample array). Also, information on filtering among the information decoded by the entropy decoder 310 may be provided to the filter 350. Meanwhile, a receiving unit (not shown) for receiving a signal output from the encoding apparatus may be further configured as an internal/external element of the decoding apparatus 300, or the receiving unit may be a component of the entropy decoder 310. Meanwhile, the decoding apparatus according to the present document may be called a video/image/picture decoding apparatus, and the decoding apparatus may be divided into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, an inter predictor 332, and an intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

In the present document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

In the present document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of the present document as well.

The predictor 330 may perform the prediction of the current block, and generate a predicted block including the prediction samples of the current block. The predictor may determine whether the intra prediction is applied or the inter prediction is applied to the current block based on the information on prediction output from the entropy decoder 310, and determine a specific intra/inter prediction mode.

The predictor 330 may generate a prediction signal based on various prediction methods to be described later. For example, the predictor may apply intra prediction or inter prediction for prediction of one block, and may simultaneously apply intra prediction and inter prediction. This may be called combined inter and intra prediction (CIIP). In addition, the predictor may be based on an intra block copy (IBC) prediction mode or based on a palette mode for prediction of a block. The IBC prediction mode or the palette mode may be used for image/video coding of content such as games, for example, screen content coding (SCC). IBC may basically perform prediction within the current picture, but may be performed similarly to inter prediction in that a reference block is derived within the current picture. That is, IBC may use at least one of the inter prediction techniques described in the present document. The palette mode may be considered as an example of intra coding or intra prediction. When the palette mode is applied, information on the palette table and the palette index may be included in the video/image information and signaled.

The intra predictor 331 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 331 may determine the prediction mode to be applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 332 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array)

output from the predictor (including inter predictor 332 and/or intra predictor 331). If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture having already been reconstructed. The stored motion information may be transferred to the inter predictor 332 so as to be utilized as the motion information of the spatial neighboring block or the motion information of the temporal neighboring block. The memory 360 may store reconstructed samples of reconstructed blocks in the current picture, and transfer the reconstructed samples to the intra predictor 331.

In the present document, the embodiments described in the filter 260, the inter predictor 221, and the intra predictor 222 of the encoding apparatus 200 may be applied equally or to correspond to the filter 350, the inter predictor 332, and the intra predictor 331.

Meanwhile, the video/image coding method according to the present document may be performed based on the following partitioning structure. Specifically, above described procedures of prediction, residual processing ((inverse) transform and (de)quantization), syntax element coding, and filtering may be performed based on CTU and CU (and/or TU and PU) derived based on the partitioning structure. A block partitioning procedure may be performed by the image partitioner 210 of the above-described encoding apparatus, and partitioning-related information may be (encoding) processed by the entropy encoder 240, and may be transferred to the decoding apparatus in the form of a bitstream. The entropy decoder 310 of the decoding apparatus may derive the block partitioning structure of the current picture based on the partitioning-related information obtained from the bitstream, and based on this, may perform a series of procedures (e.g., prediction, residual processing, block/picture reconstruction, in-loop filtering, and the like) for image decoding. The CU size and the TU size may be equal to each other, or a plurality of TUs may be present within a CU region. Meanwhile, the CU size may generally represent a luma component (sample) coding block (CB) size. The TU size may generally represent a luma component (sample) transform block (TB) size. The chroma component (sample) CB or TB size may be derived based on the luma component (sample) CB or TB size in accordance with a component ratio according to a color format (chroma format, e.g., 4:4:4, 4:2:2, 4:2:0 and the like) of a picture/image. The TU size may be derived based on maxTbSize. For example, if the CU size is larger than the maxTbSize, a plurality of TUs (TBs) of the maxTb Size may be derived from the CU, and the transform/inverse transform may be performed in the unit of TU (TB). Further, for example, in case that intra prediction is applied, the intra prediction mode/type may be derived in the unit of CU (or CB), and neighboring reference sample derivation and prediction sample generation procedures may be performed in the unit of TU (or TB). In this case, one or a plurality of TUs (or TBs) may be present in one CU (or CB) region, and in this case, the plurality of TUs (or TBs) may share the same intra prediction mode/type.

Further, in the video/image coding according to the present document, an image processing unit may have a hierarchical structure. One picture may be partitioned into one or more tiles, bricks, slices, and/or tile groups. One slice may include one or more bricks. On brick may include one or more CTU rows within a tile. The slice may include an integer number of bricks of a picture. One tile group may include one or more tiles. One tile may include one or more CTUs. The CTU may be partitioned into one or more CUs. A tile represents a rectangular region of CTUs within a particular tile column and a particular tile row in a picture. A tile group may include an integer number of tiles according to a tile raster scan in the picture. A slice header may carry information/parameters that can be applied to the corresponding slice (blocks in the slice). In case that the encoding/decoding apparatus has a multi-core processor, encoding/decoding processes for the tiles, slices, bricks, and/or tile groups may be processed in parallel. In the present document, the slice or the tile group may be used exchangeably. That is, a tile group header may be called a slice header. Here, the slice may have one of slice types including intra (I) slice, predictive (P) slice, and bi-predictive (B) slice. In predicting blocks in I slice, inter prediction may not be used, and only intra prediction may be used. Of course, even in this case, signaling may be performed by coding the original sample value without prediction. With respect to blocks in P slice, intra prediction or inter prediction may be used, and in case of using the inter prediction, only uni-prediction can be used. Meanwhile, with respect to blocks in B slice, the intra prediction or inter prediction may be used, and in case of using the inter prediction, up to bi-prediction can be maximally used.

The encoding apparatus may determine the tile/tile group, brick, slice, and maximum and minimum coding unit sizes in consideration of the coding efficiency or parallel processing, or according to the characteristics (e.g., resolution) of a video image, and information for them or information capable of inducing them may be included in the bitstream.

The decoding apparatus may obtain information representing the tile/tile group, brick, and slice of the current picture, and whether the CTU in the tile has been partitioned into a plurality of coding units. By making such information be obtained (transmitted) only under a specific condition, the efficiency can be enhanced.

As described above, one picture may include a plurality of slices, and one slice may include a slice header and slice data. In this case, one picture header may be further added for the plurality of slices (set of slice headers and slice data) in the one picture. The picture header (picture header syntax) may include information/parameters commonly applicable to the picture. The slice header (slice header syntax) may include information/parameters commonly applicable to the slice. An adaptation parameter set (APS) or a picture parameter set (PPS) may include information/parameters commonly applicable to one or more pictures. A sequence parameter set (SPS) may include information/parameters commonly applicable to one or more sequences. A video parameter set (VPS) may include information/parameters commonly applicable to multiple layers. A decoding parameter set (DPS) may include information/parameters commonly applicable to a video in general. The DPS may include information/parameters related to concatenation of coded video sequences (CVSs).

In the present document, a high-level syntax may include at least one of an APS syntax, a PPS syntax, a SPS syntax, a VPS syntax, a DPS syntax, a picture header syntax, and a slice header syntax.

In addition, for example, information on partition and configuration of the tile/tile group/brick/slice may be configured in the encoding apparatus based on the high-level syntax and may be transmitted to the decoding apparatus in the form of a bitstream.

Figure 4:
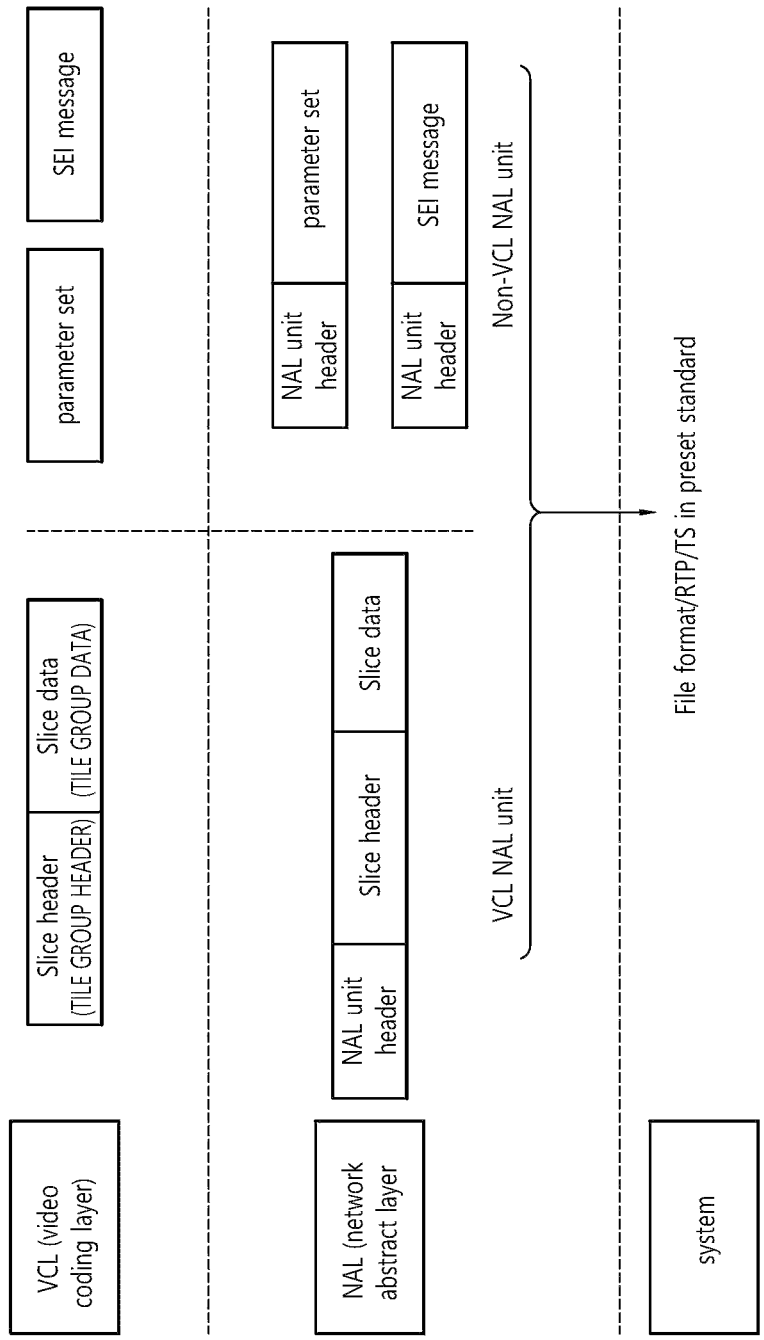
FIG. 4 illustrates a hierarchical structure for a coded image/video.

FIG. 4 exemplarily shows a hierarchical structure for a coded image/video.

Referring to FIG. 4, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RB SP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS).

In this document, a high-level syntax (HLS) may include at least one of the APS syntax, PPS syntax, SPS syntax, VPS syntax, DPS syntax, picture header syntax, and slice header syntax.

In addition, for example, the information on the partition and configuration of the tile/tile group/brick/slice may be configured in an encoding terminal based on the high-level syntax and may be transmitted to the decoding apparatus in the form of the bitstream.

In this document, the image/video encoded in the encoding apparatus and signaled to the decoding apparatus in the form of the bitstream may include not only intra-picture partitioning-related information, intra/inter prediction information, residual information, and in-loop filtering information but also the information included in the slice header, the information included in the picture header, the information included in the APS, the information included in the PPS, the information included in the SPS, the information included in the VPS, and/or the information included in the DPS. Further, the image/video information may further include the information of the NAL unit header.

A video/image encoding procedure based on inter prediction may schematically include, for example, the following.

Figure 5:
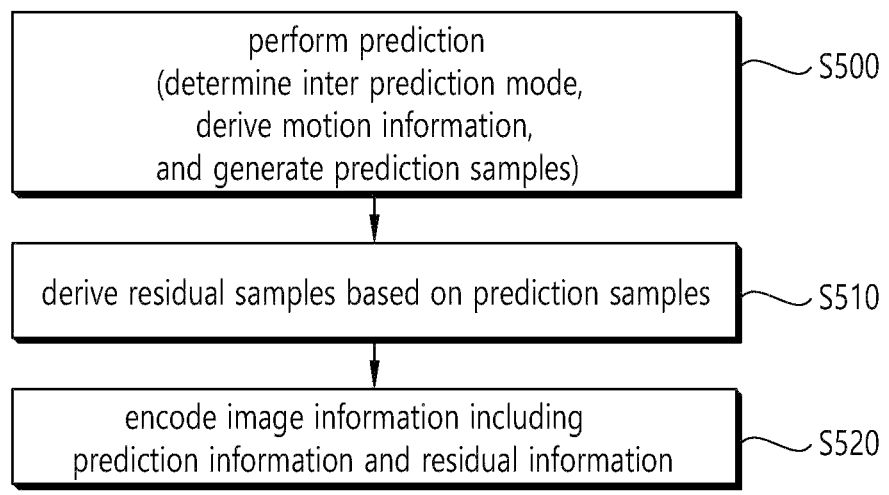
FIG. 5 illustrates an example of an inter prediction-based video/image encoding method.

FIG. 5 illustrates an example of an inter prediction-based video/image encoding method.

Referring to FIG. 5, the encoding apparatus performs inter prediction on a current block (S500). The encoding apparatus may derive an inter prediction mode and motion information on the current block, and may generate prediction samples for the current block. Here, procedures for determining the inter prediction mode, deriving the motion information, and generating the prediction samples may be performed simultaneously, or one procedure may be performed before another procedure. For example, the inter predictor of the encoding apparatus may include a prediction mode determinator, a motion information deriver, and a prediction sample deriver, wherein the prediction mode determinator may determine the prediction mode for the current block, the motion information deriver may derive the motion information on the current block, and the prediction sample deriver may derive the prediction samples for the current block. For example, the inter predictor of the encoding apparatus may search for a block similar to the current block within a predetermined area (search area) of reference pictures through motion estimation, and may derive a reference block having a difference from the current block that is a minimum or a predetermined reference level or less. The inter predictor may derive a reference picture index indicating a reference picture in which the reference block is located based on the reference block, and may derive a motion vector based on a positional difference between the reference block and the current block. The encoding apparatus may determine a mode to be applied to the current block among various prediction modes. The encoding apparatus may compare rate-distortion (RD) costs of the various prediction modes and may determine an optimal prediction mode for the current block.

For example, when a skip mode or a merge mode is applied to the current block, the encoding apparatus may construct a merge candidate list, and may derive a reference block having a difference from the current block that is the minimum or the predetermined reference level or less among reference blocks indicated by merge candidates included in the merge candidate list. In this case, a merge candidate associated with the derived reference block may be selected, and merge index information indicating the selected merge candidate may be generated and signaled to the decoding apparatus. The motion information on the current block may be derived using motion information on the selected merge candidate.

In another example, when an (A)MVP mode is applied to the current block, the encoding apparatus may construct an (A)MVP candidate list, and may use a motion vector of a motion vector predictor (mvp) candidate selected from among mvp candidates included in the (A)MVP candidate list as an mvp of the current block. In this case, for example, a motion vector indicating a reference block derived by the motion estimation may be used as a motion vector of the current block, and an mvp candidate having a motion vector having the smallest difference from the motion vector of the current block among the mvp candidates may be the selected mvp candidate. A motion vector difference (MVD), which is a difference obtained by subtracting the mvp from the motion vector of the current block, may be derived. In this case, information on the MVD may be signaled to the decoding device. When the (A)MVP mode is applied, the value of the reference picture index may be configured as reference picture index information and may be separately signaled to the decoding apparatus.

The encoding apparatus may derive residual samples based on the prediction samples (S510). The encoding apparatus may derive the residual samples by comparing original samples of the current block with the prediction samples.

The encoding apparatus encodes image information including prediction information and residual information (S520). The encoding apparatus may output the encoded image information in the form of a bitstream. The prediction information is information related to the prediction procedure, and may include prediction mode information (e.g., a skip flag, a merge flag, or a mode index) and information on motion information. The information on the motion information may include candidate selection information (e.g., a merge index, an mvp flag, or an mvp index) that is information for deriving a motion vector. In addition, the information on the motion information may include the information on the MVD and/or reference picture index information. Further, the information on the motion information may include information indicating whether L0 prediction, L1 prediction, or bi-prediction is applied. The residual information is information on the residual samples. The residual information may include information on quantized transform coefficients for the residual samples.

The output bitstream may be stored in a (digital) storage medium and be transmitted to the decoding apparatus, or may be transmitted to the decoding apparatus through a network.

As described above, the encoding apparatus may generate a reconstructed picture (including reconstructed samples and reconstructed blocks) based on the reference samples and the residual samples, which is for the encoding apparatus to derive the same prediction result as that derived by the decoding apparatus and for increasing coding efficiency. Accordingly, the encoding apparatus may store the reconstructed picture (or reconstructed samples and reconstructed block) in the memory and may use the same as a reference picture for inter prediction. As described above, an in-loop filtering procedure may be further applied to the reconstructed picture.

A video/image decoding procedure based on inter prediction may schematically include, for example, the following.

Figure 6:
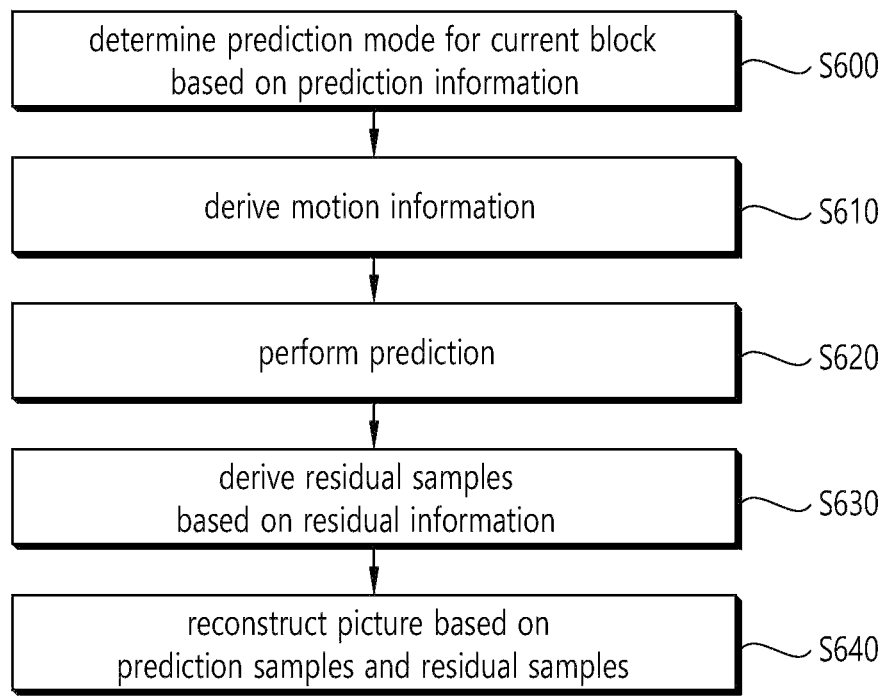
FIG. 6 illustrates an example of an inter prediction-based video/image decoding method.

FIG. 6 illustrates an example of an inter prediction-based video/image decoding method.

The decoding apparatus may perform an operation corresponding to the foregoing operation performed by the encoding apparatus. The decoding apparatus may predict the current block based on the received prediction information and may derive prediction samples.

Specifically, referring to FIG. 6, the decoding apparatus may determine a prediction mode for the current block based on the prediction information received from a bitstream (S600). The decoding apparatus may determine which inter prediction mode is applied to the current block based on prediction mode information in the prediction information.

For example, whether the merge mode is applied to the current block or whether the (A)MVP mode is determined may be determined based on the merge flag. Alternatively, one of various inter prediction mode candidates may be selected based on the merge index. The inter prediction mode candidates may include various inter prediction modes, such as the skip mode, the merge mode, and/or the (A)MVP mode.

The decoding apparatus derives motion information on the current block based on the determined inter prediction mode (S610). For example, when the skip mode or the merge mode is applied to the current block, the decoding apparatus may construct a merge candidate list to be described later and may select one merge candidate from among merge candidates included in the merge candidate list. The selection may be performed based on the foregoing selection information (merge index). The motion information on the current block may be derived using motion information on the selected merge candidate. The motion information on the selected merge candidate may be used as the motion information on the current block.

In another example, when the (A)MVP mode is applied to the current block, the decoding apparatus may construct an (A)MVP candidate list, and may use a motion vector of a motion vector predictor (mvp) candidate selected from among mvp candidates included in the (A)MVP candidate list as an mvp of the current block. The selection may be performed based on the foregoing selection information (mvp flag or mvp index). In this case, the decoding apparatus may derive an MVD of the current block based on the information on the MVD, and may derive a motion vector of the current block based on the mvp of the current block and the MVD. Further, the decoding apparatus may derive a reference picture index of the current block based on the reference picture index information. A picture indicated by the reference picture index in a reference picture list for the current block may be derived as a reference picture referenced for inter prediction of the current block.

The motion information on the current block may be derived without constructing a candidate list, in which case construction of a candidate list described above may be omitted.

The decoding apparatus may generate prediction samples for the current block based on the motion information on the current block (S620). In this case, the reference picture may be derived based on the reference picture index of the current block, and the prediction samples for the current block may be derived using samples of a reference block indicated by the motion vector of the current block in the reference picture. In this case, as described later, a prediction sample filtering procedure for all or some of the prediction samples for the current block may be further performed depending on the case.

For example, the inter predictor of the decoding apparatus may include a prediction mode determinator, a motion information deriver, and a prediction sample deriver, wherein the prediction mode determinator may determine the prediction mode for the current block based on the received prediction mode information, the motion information deriver may derive the motion information (motion vector and/or reference picture index) on the current block based on the received information on the motion information, and the prediction sample deriver may derive the prediction samples for the current block.

The decoding apparatus generates residual samples for the current block based on the received residual information (S630). The decoding apparatus may generate reconstructed samples for the current block based on the prediction samples and the residual samples, and may generate a reconstructed picture based reconstructed samples (S640). Subsequently, as described above, an in-loop filtering procedure may be further applied to the reconstructed picture.

A predicted block for a current block may be derived based on motion information derived according to a prediction mode of the current block. The predicted block may include prediction samples (prediction sample array) for the current block. When a motion vector of the current block indicates a fractional sample unit, an interpolation procedure may be performed, through which the prediction samples for the current block may be derived based on reference samples in a fractional sample unit in a reference picture. When affine inter prediction is applied to the current block, the prediction samples may be generated based on a motion vector (MV) in a sample/subblock unit. When bi-prediction is applied, prediction samples derived through the weighted sum or weighted average of prediction samples derived based on L0 prediction (i.e., prediction using a reference picture in reference picture list L0 and MVL0) and prediction samples derived based on L1 prediction (i.e., prediction using a reference picture in reference picture list L1 and MVL1) (according to phase) may be used as the prediction samples for the current block. A case where bi-prediction is applied and the reference picture used for L0 prediction and the reference picture used for L1 prediction are located in different temporal directions with respect to the current picture (i.e., corresponding to bi-prediction and bidirectional prediction) may be referred to as true bi-prediction.

As described above, reconstructed samples and reconstructed pictures may be generated based on the derived prediction samples, after which an in-loop filtering procedures may be performed.

In inter prediction, weighted sample prediction may be used. Weighted sample prediction may be referred to as weighted prediction. Weighted prediction may be applied when the slice type of a current slice in which a current block (e.g., CU) is located is a P slice or a B slice. That is, weighted prediction may be used not only when bi-prediction is applied but also when uni-prediction is applied. For example, as described below, weighted prediction may be determined based on weightedPredFlag, and the value of weightedPredFlag may be determined based on signaled pps_weighted_pred_flag (in a case of a P slice) or pps_weighted_bipred_flag (in a case of a B slice). For example, when slice_type is P, weightedPredFlag may be set to pps_weighted_pred_flag. Otherwise (when slice_type is B), weightedPredFlag may be set to pps_weighted_bipred_flag.

Prediction samples as output of weighted prediction or the values of the prediction samples may be referred to as pbSamples.

Weighted prediction procedures may be largely divided into a default weighted (sample) prediction procedure and an explicit weighted (sample) prediction procedure. A weighted (sample) prediction procedure may refer to only the explicit weighted (sample) prediction procedure. For example, when the value of weightedPredFlag is 0, the values of prediction samples (pbSamples) may be derived based on the default weighted (sample) prediction procedure. When the value of weightedPredFlag is 1, the values of prediction samples (pbSamples) may be derived based on the explicit weighted (sample) prediction procedure.

When bi-prediction is applied to a current block, prediction samples may be derived based on a weighted average. Conventionally, a bi-prediction signal (i.e., bi-prediction samples) may be derived through simple averaging of an L0 prediction signal (L0 prediction samples) and an L1 prediction signal (L1 prediction samples). That is, the bi-prediction samples are derived as the average of the L0 prediction samples based on an L0 reference picture and MVL0 and the L1 prediction samples based on an L1 reference picture and MVL1. However, according to the present document, when bi-prediction is applied, a bi-prediction signal (bi-prediction samples) may be derived through weighted averaging of the L0 prediction signal and the L1 prediction signal.

Bi-directional optical flow (BDOF) may be used to refine a bi-prediction signal. BDOF is for generating prediction samples by calculating improved motion information when bi-prediction is applied to a current block (e.g., a CU), and the process of calculating the improved motion information may be included in the motion information derivation operation.

For example, BDOF may be applied in a 4×4 subblock level. That is, BDOF may be performed in units of 4×4 subblocks in the current block. BDOF may be applied only to a luma component. Alternatively, BDOF may be applied only to a chroma component, or may be applied to a luma component and a chroma component.

As described above, a high-level syntax (HLS) may be coded/signaled for video/image coding. Video/image information may be included in the HLS.

A coded picture may include one or more slices. A parameter describing the coded picture is signaled in a picture header, and a parameter describing a slice is signaled in a slice header. The picture header is carried in the form of an independent NAL unit. The slice header exists at the beginning of a NAL unit including a payload of the slice (i.e., slice data).

Each picture is associated with a picture header. A picture may include different types of slices (intra-coded slices (i.e., I slices) and inter-coded slices (i.e., P slices and B slices)). Accordingly, a picture header may include syntax elements necessary for an intra slice of a picture and an inter slice of the picture.

A picture may be partitioned into subpictures, tiles, and/or slices. Subpicture signaling may exist in a sequence parameter set (SPS), and tile and square slice signaling may exist in a picture parameter set (PPS). Raster scan slice signaling may exist in a slice header.

When weighted prediction is applied for inter prediction of a current block, the weighted prediction may be performed based on information on the weighted prediction.

A weighted prediction procedure may start based on two flags in an SPS.

For example, syntax elements shown below in Table 1 may be included in an SPS syntax with respect to the weighted prediction.

TABLE 1

| | Descriptor |
|---|---|
| seq_parameter_set_rbsp( ) { | |
|   sps_decoding_parameter_set_id | u(4) |
| ... | |

TABLE 1-continued

| | Descriptor |
|---|---|
|   sps_weighted_pred_flag | u(1) |
|   sps_weighted_bipred_flag | u(1) |
| ... | |
| } | |

In Table 1, the value of sps_weighted_pred_flag equal to 1 may indicate that weighted prediction is applied to P slices referring to the SPS.

The value of sps_weighted_bipred_flag equal to 1 may indicate that weighted prediction is applied to B slices referring to the SPS. The value of sps_weighted_bipred_flag equal to 0 may indicate that weighted prediction is not applied to B slices referring to the SPS.

The two flags signaled in the SPS indicate whether weighted prediction is applied to P and B slices in a coded video sequence (CVS).

Syntax elements shown below in Table 2 may be included in a PPS syntax with respect to the weighted prediction.

TABLE 2

| | Descriptor |
|---|---|
| pic_parameter_set_rbsp( ) { | |
|   pps_pic_parameter_set_id | ue(v) |
| ... | |
|   pps_weighted_pred_flag | u(1) |
|   pps_weighted_bipred_flag | u(1) |
| ... | |

In Table 2, the value of pps_weighted_pred_flag equal to 0 may indicate that weighted prediction is not applied to P slices referring to the PPS. The value of pps_weighted_pred_flag equal to 1 may indicate that weighted prediction is applied to the P slices referring to the PPS. When the value of sps_weighted_pred_flag is 0, the value of pps_weighted_pred_flag is 0.

The value of pps_weighted_bipred_flag equal to 0 may indicate that weighted prediction is not applied to B slices referring to the PPS. The value of pps_weighted_bipred_flag equal to 1 may indicate that explicit weighted prediction is applied to the B slices referring to the PPS. When the value of sps_weighted_bipred_flag is 0, the value of pps_weighted_bipred_flag is 0.

Additionally, syntax elements shown below in Table 3 may be included in a slice header syntax.

TABLE 3

| | Descriptor |
|---|---|
| slice_header( ) { | |
|   slice_pic_parameter_set_id | ue(v) |
| ... | |
|   if( ( nal_unit_type != IDR_W_RADL && nal_unit_type != IDR_N_LP ) \|\| | |
|     sps_idr_rpl_present_flag ) { | |
|     for( i = 0; i < 2; i++ ){ | |
|       if( num_ref_pic_lists_in_sps[ i ] > 0 && !pps_ref_pic_list_sps_idc[ i ] && | |
|         ( i == 0 \|\| ( i == 1 && rpl1_idx_present_flag ) ) ) | |
|         ref_pic_list_sps_flag[ i ] | |
|       if( ref_pic_list_sps_flag[ i ] ) { | |
|         if( num_ref_pic_lists_in_sps[ i ] > 1 && | |
|           ( i == 0 \|\| ( i == 1 && rpl1_idx_present_flag ) ) ) | |
|         ref_pic_list_idx[ i ] | |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         if( ltrp_in_slice_header_flag[ i ][ RplsIdx[ i ] ] ) | |
|           slice_poc_lsb_lt[ i ][ j ] | |
|         delta_poc_msb_present_flag[ i ][ j ] | |
|         if( delta_poc_msb_present_flag[ i ][ j ] ) | |
|           delta_poc_msb_cycle_lt[ i ][ j ] | |
|       } | |
|     } | |
|     if( ( slice_type != I && num_ref_entries[ 0 ][ RplsIdx[ 0 ] ] > 1 ) \|\| | |

TABLE 3-continued

```
    (slice type == B && num_ref_entries[ 1 ][ RplsIdx[ 1 ] ] > 1 ) ) {
        num_ref_idx_active_override_flag
        if( num_ref_idx_active_override_flag )
            for( i = 0; i < ( slice_type == B ? 2: 1 ); i++ )
                if( num_ref_entries[ i ][ RplsIdx[ i ] ] > 1 )
                    num_ref_idx_active_minus1[ i ]
        }
    }
    ...
    if( (pps_weighted_pred_flag && slice_type == P ) ||
        ( pps_weighted_bipred_flag && slice_type == B ) )
        pred_weight_ table( )
    ...
}
```

In Table 3, slice_pic_parameter_set_id indicates the value of pps_pic_parameter_set_id for a PPS being used. The value of slice_pic_parameter_set_id is included in a range from 0 to 63.

The value of a temporary ID (TempralID) of the current picture needs to be greater than or equal to the value of TempralID of the PPS having pps_pic_parameter_set_id that is the same as slice_pic_parameter_set_id.

A prediction weighted table syntax may include information on weighted prediction shown below in Table 4.

TABLE 4

| pred_weight_table(){ | Descriptor |
|---|---|
|   luma_log2_weight_denom | ue(v) |
|   if( ChromaArrayType != 0) | |
|     delta_chroma_log2_weight_denom | se(v) |
|   for( i=0; i < NumRefIdxActive[ 0]; i++) | |
|     luma_weight_10_flag[ i ] | u(1) |
|   if( ChromaArrayType != 0) | |
|     for( i =0,1<NumRefIdxActive[ 0 ]; i++) | |
|       chroma_weight_10_flag[ i ] | u(1) |
|   for( i=0; i < NumRefIdxActive[ 0]; i++) { | |
|     if( luma_weight_10_flag[ i ]) { | |
|       delta_luma_weight_10[ i ] | se(v) |
|       luma_offset_10[i] | se(v) |
|     } | |
|     if( chroma_weight_10_flag[ i ]) | |
|       for( j = 0; j < 2;j++) ( | |
|         delta_chroma_weight _10[ i ][ j ] | se(v) |
|         delta_chroma_offset_10[ + ][ j ] | se(v) |
|       } | |
|   } | |
|   if( slice_type == B) { | |
|     for( i=0; i < NumRefIdxActive[ 1 ]; i++ ) | |
|       luma_weight_11_flag[ i ] | u(1) |
|     if( ChromaArrayType != 0) | |
|       for( i=0; i <NumRefIdxActive[ 1 ]; i++) | |
|         chroma_weight_11_flag[ i ]. | u(1) |
|     for( i= 0; i < NumRefIdxActive[ 1]; i++) { | |
|       if( luma_weight_11_flag[ i]) { | |
|         delta_luma_weight_l[ i] | se(v) |
|         luma_offset_I1[ i ] | se(v): |
|       } | |
|       if( chroma_weight_11_flag[ i ]) | |
|         for( )=0; j<2; j++) { | |
|           delta_chroma_weight_l1[ i ][ j ] | se(v) |
|           delta_chroma_offset_li[ i ][ j ] | se(v) |
|         } | |
|       } | |
|     } | |
|   } | |
| } | |

In Table 4, luma_log2_weight_denom is the base-2 logarithm of a denominator for all luma weighting factors. The value of luma_log2_weight_denom is included in a range from 0 to 7.

delta_chroma_log2_weight_denom is the difference in the base-2 logarithm of a denominator for all chroma weighting factors. When delta_chroma_log2_weight_denom does not exist, delta_chroma_log2_weight_denom is inferred as 0.

ChromaLog2WeightDenom is derived as luma_log2_weight_denom+ delta_chroma_log2_weight_denom, and the value thereof is included in a range from 0 to 7.

The value of luma_weight_10_flag[i] equal to 1 indicates that there are weighting factors for a luma component of (reference picture) list 0 (L0) prediction using RefPicList [0][i]. The value of luma_weight_10_flag[i] equal to 0 indicates that these weighting factors do not exist.

The value of chroma_weight_10_flag[i] equal to 1 indicates that there are weighting factors for chroma prediction values of L0 prediction using RefPicList[0][i]. The value of chroma_weight_10_flag[i] equal to 0 indicates that these weighting factors do not exist. When chroma_weight_10_flag[i] does not exist, chroma_weight_10_flag[i] is inferred as 0.

delta_luma_weight_10[i] is the difference in weighting factor applied to a luma prediction value for L0 prediction using RefPicList[0][i].

LumaWeightL0[i] is derived as (1<<luma_log2_weight_denom)+delta_luma_weight_10[i]. When luma_weight_10_flag[i] is 1, the value of delta_luma_weight_10[i] is included in a range from −128 to 127. When luma_weight_10_flag[i] is 0, LumaWeightL0[i] is inferred as $2^{luma\_log2\_weight\_denom}$.

luma_offset_10[i] is an additive offset applied to a luma prediction value for L0 prediction using RefPicList[0][i]. The value of luma_offset_10[i] is included in a range from −128 to 127. When the value of luma_weight_10_flag[i] is 0, the value of luma_offset_10[i] is inferred as 0.

delta_chroma_weight_10[i][j] is the difference in weighting factor applied to a chroma prediction values for L0 prediction using RefPicList[0][i] where j is 0 for Cb and j is 1 for Cr.

ChromaWeightL0[i][j] is derived as (1<<ChromaLog2WeightDenom)+delta_ chroma_weight_l0[i][j]. When chroma_weight_l0_flag[i] is 1, the value of delta_chroma_weight_l0[i][j] is included in a range from −128 to 127. When chroma_weight_l0_flag [i] is 0, ChromaWeightL0[i][j] is inferred as $2^{ChromaLog2WmghtDenom}$.

delta_chroma_offset_l0[i][j] is the difference in additive offset applied to the chroma prediction value for L0 prediction using RefPicList[0][i] where j is 0 for Cb and j is 1 for Cr.

The value of delta_chroma_offset_l0[i][j] is included in a range from −4×128 to 4 x 127. When the value of chroma_weight_l0_flag[i] is 0, the value of ChromaOffsetL0[i][j] is inferred as 0.

The prediction weighted table syntax is frequently used to modify a sequence when there is a scene change. An existing prediction weighted table syntax is signaled in a slice header when a PPS flag for weighted prediction is enabled and a slice type is P, or when a PPS flag for weighted bi-prediction is enabled and a slice type is B. However, there may be often cases where a prediction weighted table needs to be adjusted for one or a plurality of frames when there is a scene change. In general, when a PPS is shared for a plurality of frames, signaling information on weighted prediction for all frames referring to the PPS may be unnecessary.

The following drawings are provided to describe specific examples of the present document. Since specific terms for devices or specific terms for signals/messages illustrated in the drawings are provided for illustration, technical features of the present disclosure are not limited to the specific terms used in the following drawings.

The present document provides the following methods to solve the foregoing problems. The methods may be applied independently or may be applied in combination with each other.

1. A tool for weighted prediction (information on weighted prediction) may be applied in a picture level rather than in a slice level. Weighting values are applied to a specific reference picture of a picture, and are used for all slices of the picture.

2. A prediction weighted table syntax may be signaled in the picture level rather than in the slice level. To this end, the prediction weighted table syntax may be signaled in a picture header (PH) or a picture parameter set (PPS).

3. When weighted prediction is applied to a picture, all slices in the picture may have the same active reference pictures. This includes the order of active reference pictures in a reference picture list (RPL) (i.e., L0 for P slices and L0 and L1 for B slices).

4. Alternatively, when the above does not apply, the following may apply.
  a. Signaling of weighted prediction is independent of signaling of a reference picture list. That is, in signaling of a prediction weighted table, there is no assumption about the order of reference pictures in the reference picture list.
  b. There is no signaling of weighted prediction values for reference pictures in L0 and L1. For the reference pictures, the weighting values are provided directly.
  c. Only one loop may be used rather than two loops to signal a weighting value for a reference picture. In each loop, a reference picture associated with a signaled weighting value is first identified.
  d. Reference picture identification is based on a picture order count (POC) value.
  e. For bit saving, a delta POC value between a reference picture and a current picture may be signaled rather than signaling the POC value of the reference picture.

5. In addition to item 4, to signal the delta POC value between the reference picture and the current picture, the following may be applied so that an absolute delta POC value may be signaled as follows.
  a. A first signaled delta POC is the delta between the POC of the reference picture and the POC of current picture.
  b. The rest of signaled delta POCs (i.e., where i starts from 1) is the delta between the POC of an ith reference picture and the POC of an (i-1)th reference picture.

6. Two flags in a PPS may be unified into a single control flag (e.g., pps_weighted_pred_flag). The flag may be used to indicate that an additional flag exists in a picture header.
  a. The flag in the PH may be conditioned on the PPS flag, and when a NAL unit type is not instantaneous decoding refresh (IDR), existence of pred_weighted_table( ) data (prediction weighted table syntax)) may be further indicated.

7. Two flags (pps_weighted_pred_flag and pps_weighted_bipred_flag) signaled in a PPS may be unified into one flag. The one flag may use the existing name of pps_weighted_pred_flag.

8. A flag may be signaled in a picture header to indicate whether weighted prediction is applied to a picture associated with the picture header. The flag may be referred to as pic_weighted_pred_flag.
  a. Existence of pic_weighted_pred_flag may be conditioned on the value of pps_weighted_pred_flag. When the value of pps_weighted_pred_flag is 0, pic_weighted_pred_flag does not exist, and the value thereof may be inferred as 0.
  b. When the value of pic_weighted_pred_flag is 1, signaling of pred_weighted_table( ) may exist in the picture header.

9. Alternatively, when weighted prediction is enabled (i.e., the value of pps_weighted_pred_flag is 1 or the value of pps_weighted_bipred_flag is 1), information on the weighted prediction may still exist in a slice header, and the following may apply.
  a. A new flag may be signaled to indicate whether the information on the weighted prediction exists in the slice header. The flag may be referred to as slice_weighted_pred_present_flag.
  b. Existence of slice_weighted_pred_present_flag may be determined according to a slice type and the values of pps_weighted_pred_flag and pps_weighted_bipred_flag.

In the present document, information on weighted prediction may include information/syntax elements related to the weighted prediction described in Table 1 to Table 4. Video/image information may include various pieces of information for inter prediction, such as information on weighted prediction, residual information, and inter prediction mode information. The inter prediction mode information may include information/syntax elements, such as information indicating whether a merge mode or an MVP mode is applicable to a current block and selection information for selecting one of motion candidates in a motion candidate list. For example, when the merge mode is applied to the current block, a merge candidate list is constructed based on neighboring blocks of the current block, and one candidate for deriving motion information on the current block may be selected/used (based on a merge index) from the merge candidate list. In another example, when the MVP mode is applied to the current block, an mvp candidate list may be constructed based on neighboring blocks of the current block, and one candidate for deriving motion information on the current block may be selected/used (based on an mvp flag) from the mvp candidate list.

In an embodiment, for weighted prediction in inter prediction, a PPS may include syntax elements shown below in Table 5, and the semantics of the syntax elements may be as shown below in Table 6.

TABLE 5

| pic_parameter_set_rbsp() { | Descriptor |
|---|---|
| pps_pic_parameter_set_id | ue(v) |
| ... | |
| pps_weighted_pred_flag | u(1) |
| ... | |
| } | |

TABLE 6 pps_weighted_pred_flag equal to 0 specifies that weighted prediction is not applied to P or B slices referring to the PPS. pps_weighted_pred_flag equal to 1 specifies that weighted prediction is applied to P or B slices referring to the PPS. When sps_weighted_pred_flag is equal to 0, the value of pps_weighted_pred_flag shall be equal to 0.

Referring to Table 5 and Table 6, the value of pps_weighted_pred_flag equal to 0 may indicate that weighted prediction is not applied to P or B slices referring to the PPS. The value of pps_weighted_pred_flag equal to 1 may indicate that weighted prediction is applied to P or B slices referring to the PPS.

In addition, a picture header may include syntax elements shown below in Table 7, and the semantics of the syntax elements may be as shown below in Table 8.

TABLE 7

| picture_header_rbsp() { | Descriptor |
|---|---|
| non_reference_picture_flag | u(1) |
| ... | |
| pic_rpl_present_flag | n(1) |
| if( pic_rpl_present_flap ) { | |
| for( i=0; i<2:i++) { | |
| if( num_ref_pic_lists_in_sps[ i ]>0 && !pps_ref_pic_list_sps_idc[ i ] && | |
| (i == 0 || (i == 1 && rpl1_idx_present_flag))) | |
| pic_rpl_sps_flag[i] | u(1) |
| if( pic_rpl_sps_flag[i]) { | |
| if( num_ref_pic_lists_in_sps[ i]>1 && | |
| (i == 0 || (i == 1 && rpl1_idx_present_flag ) ) ) | |
| pic_rpl_idx[ i] | u(v) |
| } else | |
| ref_pic_list_struct( i, num_ref_pic_lists_in_sps[ i ]) | |
| for( j = 0;j < NumLtrpEntries[ i ][ RplsIdx[ i ]]: j++){ | |
| if( ltrp_in_slice_header_flag[ i ][ RplsIdx[ i ] ]) | |
| pic_poc_lsb_lt[ i ][j ] | u(v) |
| pic_delta_poc_msb_present_flag[ i ][ j ] | u(1) |
| if( pic_delta_poc_msb_present_flag[ i ][j] ) | |
| pic_delta_poc_ msb_cycle_lt[ i ][i ] | ue(v) |
| } | |
| } | |
| } | |
| if( pps_weighted_pred_flag ) { | |
| pic_weighted_pred_flag | u(1) |
| if( (pic_weighted_pred_flag && ( nal_unit_type != IDR_W_RADL & & nal_unit_type != IDR_N_LP) )) | |
| pred_weight_table( ) | |
| } | |
| ... | |
| } | |

TABLE 8 pic_weighted_pred_flag equal to 0 specifies that weighted prediction is not applied to P or B slices referring to the PH. pic_weighted_pred_flag equal to 1 specifies that weighted prediction is applied to P or B slices referring to the PH. When not present, the value of pic_weighted_pred_flag shall be equal to 0.

Referring to Table 7 and Table 8, the value of pic_weighted_pred_flag equal to 0 may indicate that weighted prediction is not applied to P or B slices referring to the picture header. The value of pic_weighted_pred_flag equal to 1 may indicate that weighted prediction is applied to P or B slices referring to the picture header.

When the value of pic_weighted_pred_flag is 1, all slices in the picture associated with the picture header may have the same reference picture lists. Otherwise, when the value of pic_weighted_pred_flag is 1, the value of pic_rpl_present_flag may be 1.

In the absence of the above condition, pic_weighted_pred_flag may be signaled as shown below in Table 9.

TABLE 9

| picture_header_rbsp( ) { | Descriptor |
|---|---|
| ... | |
|   pic_rpl_present_flag | u(1) |
|   if( pic_rpl_present_flag ) { | |
|     ... | |
|   } | |
|   if( pps_weighted_pred_flag && pic_rpl_present_flag ) { | |
|     pic_weighted_pred_flag | u(1) |
|     if( (picweighted pred flag && ( nal unit type != IDR W RADL && | |
|       nal_unit_type: != IDR_N_LP ))) | |
|       pred_weight_table( ) | |
|   } | |
| ... | |
| } | |

Meanwhile, a slice header may include syntax elements shown below in Table 10.

TABLE 10

| slice_header() { | Descriptor |
|---|---|
|   slice_pic_parameter_set_id | ue(v) |
| ... | |
|   if( ( nal_unit_type != IDR_W_RADL && nal_unit_type != IDR_N_LP) \|\| | |
|     sps_idr_rpl_present_flag ) { | |
|     for( i=0;1<2; i++){ | |
|       if( num_ref_pic_lists_in_sps[ i ] >0 && !pps_ref_pic_list_sps_idc[ i ] && | |
|         (i == 0 (1 == 1 && rpl1_idx_present_flag ))) | |
|       ref_pic_list_sps_flag[ i ] | |
|       if(ref_pic_list_sps_flag[ i ]) { | |
|         if( num_ref_pic_lists_in_sps[ i]> 1 && | |
|           (i == 0 (1 == 1 && rpl1_idx_present_flag ))) | |
|         ref_pic_list_idx[ i ] | |
|       } else | |
|         ref_pic_list_struct( i, num _ref_pic_lists_in_sps[ i ] ). | |
|       for( j =0; j < NumLtrpEntries[ i ][ RplsIdx[ i ] ]; j++) { | |
|         if( ltrp_in_slice_header_flag[ i ][ RplsIdx[ i ]]) | |
|           slice_poc_lsb_lt[ i ][ j ] | |
|         delta_poc_msb_present_flag[ i][ j ] | |
|         if( delta_poc_msb_present_flag[ i ][ j ]) | |
|           delta_poc_msb_cycle_lt[ i ][ j ] | |
|       } | |
|     } | |
|     if( ( slice_type != I && num_ref_entries[ 0 ][ RplsIdx[ 0 ] ]>1) \|\| | |
|       (slice_type == B && num_ref_entries[ 1 ][ RplsIdx[ 1] ]>1)){ | |
|       num_ref_idx_active_override_flag | |
|       if( num_ref _idx_active_override_flag ) | |
|         for( i=0; i < (slice_type == B?2:1); i++) | |
|           if( num_ref_entries[ i ][ RplsIdx[ i ]]>1) | |
|             num_ref_idx_active_minus1[ i ] | |
|     } | |
|   } | |
| ... | |
| } | |

Further, a prediction weighted table syntax may include syntax elements shown below in Table 11, and the semantics of the syntax elements may be as shown below in Table 12.

TABLE 11

| pred_weight_table() { | Descriptor |
|---|---|
|   luma_log2_weight_denom | ue(v) |
|   if( ChromaArrayType != 0) | |
|     delta_chroma_log2_weight_denom | se(v) |
|   num_l0_weighted_ref_pics | ue(v) |
|   for( i = 0; i < num_l0_weighted_ref_pics; i++) | |
|     luma_weight_l0_flag[ i ] | u(1) |
|   if( ChromaArrayType != 0) | |
|     for( i=0; i< NumRefIdxActive[ 0 ]; i++) | |
|       chroma_weight_l0_flag[ i ] | u(1) |

TABLE 11-continued

| | |
|---|---|
|   for( i=0; i < NumRefIdxActive[ 0]; i++) { | |
|     if( luma_weight_l0_flag[ i ]) { | |
|       delta_luma_weight_l0[ i ] | se(v) |
|       luma_offset_l0[ i ] | se(v) |
|     } | |
|     if( chroma_weight_l0_flag[ i ]) | |
|       for(j=0; j<2; j++) { | |
|         delta_chroma_weight_l0[ i ][ j ] | se(v) |
|         delta_chroma_offset_l0[ i ][ j ] | se(v) |
|       } | |
|   } | |
|   num_l1_weighted_ref_pics | ue(v) |
|   for( i=0; i< num_l1_weighted_ref_pics; i++ ) | |
|     luma_weight_l1_flag[ i ] | u(1) |
|   if( ChromaArrayType: != 0) | |
|     for( i=0; i<NumRefIdxActive[ 1 ]; i++ ) | |

TABLE 11-continued

```
  chroma_weight_l1_flag[ i ]                              u(1)
for( i=0;i<NumRefIdxActive[ 1 ]; i++){
  if( luma_weight_l1_flag[ i ]) {
    delta_luma_weight_l1[ i ]                             se(v)
    luma_offset_l1[ i ]                                   se(v)
  }
  if( chroma_weight_l1_flag[ i ])
    for(j=0;j<2;j++){
      delta_chroma_weight_l1[ i ][ j ]                    se(v)
      delta_chroma_offset_l1[ i ][ j ]                    se(v)
    }
  }
}
```

TABLE 12 num_l0_weighted_ref_pics specifies the number of reference pictures in reference picture list 0 that are weighted.
The value of num_l0_weighted_ref_pics shall ranges from 0 to MaxDecPicBuffMinus1 + 14, inclusive.
num_l1_weighted_ref_pics specifies the number of reference pictures in reference picture list 1 that are weighted.
The value of num_l1_weighted_ref_pics shall ranges from 0 to MaxDecPicBuffMinus1 + 14, inclusive.

Referring to Table 11 and Table 12, num_l0_weighted_ref_pics may indicate the number of weighted reference pictures in reference picture list 0. The value of num_l0_weighted_ref_pics is included in a range from 0 to MaxDecPicBuffMinusl+14.

num_l1_weighted_ref_pics may indicate the number of weighted reference pictures in reference picture list 1. The value of num_l1_weighted_ref_pics is included in a range from 0 to MaxDecPicBuffMinusl+14.

The value of luma_weight_l0_flag[i] equal to 1 indicates that there are weighting factors for a luma component of list 0 (L0) prediction using RefPicList[0][i].

The value of chroma_weight_l0_flag[i] equal to 1 indicates that there are weighting factors for chroma prediction values of L0 prediction using RefPicList[0][i]. The value of chroma_weight_l0_flag[i] equal to 0 indicates that these weighting factors do not exist.

The value of luma_weight_l1_flag[i] equal to 1 indicates that there are weighting factors for a luma component of list 1 (L1) prediction using RefPicList[0][i].

chroma_weight_l1_flag[i] indicates that there are weighting factors for chroma prediction values of L1 prediction using RefPicList[0][i]. The value of chroma_weight_l0_flag[i] equal to 0 indicates that these weighting factors do not exist.

For example, when weighted prediction is applied to the current block, the encoding apparatus may generate number information on weighted reference pictures in a reference picture list of the current block based on the weighted prediction. The number information may refer to number information on weightings signaled for items (reference pictures) in an L0 reference picture list and/or an L1 reference picture list. That is, the value of the number information may be equal to the number of weighted reference pictures in the reference picture list (L0 and/or L1). Thus, when the value of the number information is n, the prediction weighted table syntax may include n weighting factor-related flags for the reference picture list. The weighting factor-related flags may correspond to luma_weight_l0_flag, luma_weight_l1_flag, chroma_weight_l0_flag, and/or chroma_weight_l0_flag of Table 11. Weightings for the current picture may be derived based on the weighting factor-related flags.

When weighted bi-prediction is applied to the current block, the prediction weighted table syntax may independently include number information on weighted reference pictures in the L1 reference picture list and number information on weighted reference pictures in the L0 reference picture list as shown in Table 11. The weighting factor-related flags may be independently included for each of the number information on the weighted reference pictures in the L1 reference picture list and the number information on the weighted reference pictures in the L0 reference picture list. That is, the prediction weighed table syntax may include the same number of luma_weight_l0_flag and/or chroma_weight_l0_flag as the number of weighted reference pictures in the L0 reference picture list and may include the same number of luma_weight_l1_flags and/or chroma_weight_l1_flags as the number of weighted reference pictures in the L1 reference picture list.

The encoding apparatus may encode image information including the number information and the weighting factor-related flags and may output the encoded image information in the form of a bitstream. Here, the number information and the weighting factor-related flags may be included in the prediction weighted table syntax in the image information as shown in Table 11. The prediction weighted table syntax may be included in a picture header in the image information or in a slice header in the image information. To indicate whether the prediction weighted table syntax is included in the picture header, that is, to indicate whether information on the weighted prediction exists in the picture header, a weighted prediction-related flag may be included in a picture parameter set and/or the picture header. When the weighted prediction-related flag is included in the picture parameter set, the weighted prediction-related flag may correspond to pps_weighted_pred_flag of Table 5. When the weighted prediction-related flag is included in the picture header, the weighted prediction-related flag may correspond to pic_weighted_pred_flag of Table 7. Alternatively, both pps_weighted_pred_flag and pic_weighted_pred_flag may be included in the image information to indicate whether the prediction weighted table syntax is included in the picture header.

When the weighted prediction-related flag is parsed from the bitstream, the decoding apparatus may parse the prediction weighted table syntax from the bitstream based on the parsed flag. The weighted prediction-related flag may be parsed from the picture parameter set and/or the picture header of the bitstream. In other words, the weighted prediction-related flag may include pps_weighted_pred_flag and/or pic_weighted_pred_flag. When the values of pps_weighted_pred_flag and/or pic_weighted_pred_flag are 1, the decoding apparatus may parse the prediction weighted table syntax from the picture header of the bitstream.

When the prediction weighted table syntax is parsed from the picture header (when the values of pps_weighted_pred_flag and/or pic_weighted_pred_flag are 1), the decoding apparatus may apply the information on the weighted prediction included in the prediction weighted table syntax to all slices in the current picture. In other words, when the prediction weighted table syntax is parsed from the picture header, all slices in the picture associated with the picture header may have the same reference picture list.

The decoding apparatus may parse the number information on the weighted reference pictures in the reference picture list of the current block based on the prediction weighted table syntax. The value of the number information may be equal to the number of weighted reference pictures in the reference picture list. When weighted bi-prediction is applied to the current block, the decoding apparatus may independently parse the number information on the weighted reference pictures in the L1 reference picture list and the number information on the weighted reference pictures in the L0 reference picture list from the prediction weighted table syntax.

The decoding apparatus may parse the weighting factor-related flags for the reference picture list from the prediction weighted table syntax based on the number information. The weighting factor-related flags may correspond to luma_weight_l0_flag, luma_weight_l1_flag, chroma_weight_l0_flag, and/or chroma_weight_l0_flag of Table 11. For example, when the value of the number information is n, the decoding apparatus may parse n weighting factor-related flags from the prediction weighted table syntax. The decoding apparatus may derive weightings for the reference pictures of the current block based on the weighting factor-related flags, and may perform weighted prediction on the current block based on the weightings, thereby generating or deriving prediction samples. Subsequently, the decoding apparatus may generate or derive reconstructed samples for the current block based on the prediction samples, and may reconstruct the current picture based on the reconstructed samples.

In another embodiment, for weighted prediction in inter prediction, a picture header may include syntax elements shown below in Table 13, and the semantics of the syntax elements may be as shown below in Table 14.

TABLE 13

| | Descriptor |
|---|---|
| picture_header_rbsp( ) { | |
|   non_reference_picture_flag | u(1) |
|   ... | |
|   pic_weighted pred_flag | u(1) |
|   pic_rpl_present_flag | u(1) |
|   if(pic_rpl_present_flag ) { | |
|     for( i=0; i < 2; i++) { | |
|       if( num_ref_pic_lists_in_sps[ i ] >0 && !pps_ref_pic list_sps_idc[ i ] && | |
|         (i == 0 || (i == 1 && rpll_ idx_present_flag ))) | |
|       pic_rpl_sps_flag[ i] | u(1) |
|       if( pic_rpl_sps_flag[ i]) { | |
|         if( num_ref_pic_lists_in_sps[ i ]>1 && | |
|           (i == 0 || (i == 1 && rpll_idx_present_flag ))) | |
|         pic_rpl_idx[ i] | u(v) |
|       } else | |
|         ref_pic_list_struct( i, num_ref_pic_lists_in_sps[ i ]) | |
|       for( j = 0; ] < NumLtrpEntries[ i ][ RplsIdx[ i ] ]; ]++) { | |
|         if( ltrp_in_slice_header_flag[ i ][ RplsIdx[ i ]]) | |
|           pic_poc_lsb_lt[ i ][ j ] | u(v) |
|         pic_delta_poc_msb_present_flag[ i ][ j ] | u(1) |
|         if( pic_delta_poc_msb_present_flag[ i ][ j ]) | |
|           pic_ delta poc msb_cycle_lt[ i ][ j ] | ue(v) |
|       if( ( pic_weighted_pred_flag && ( nal_unit_type = IDR_W_RADL && nal_unit_type != IDR_N_LP ) )) | |
|         pred_weight_table( ) | |
|       } | |
|     } | |
|   } | |
|   ... | |
| } | |

TABLE 14 pic_weighted_pred_flag equal to 0 specifies that weighted prediction is not applied to P or B slices referring to the PH, pic_weighted_pred_flag equal to 1 specifies that weighted prediction is applied to P or B slices referring to the PH. When sps_weighted_pred_flag is equal to 0, the value of pic_weighted_pred_flag shall be equal to 0.

NOTE-
It is constraint that all slices have the same RPL if the pred_weighted_table( ) is present in the PH.

Referring to Table 13 and Table 14, when the value of pic_weighted_pred_flag equal to 0 may indicate that weighted prediction is not applied to P or B slices referring to the picture header. The value of pic_weighted_pred_flag equal to 1 may indicate that weighted prediction is applied to P or B slices referring to the picture header. When the value of sps_weighted_pred_flag is 0, the value of pic_weighted_pred_flag is 0.

A slice header may include syntax elements shown below in Table 15.

TABLE 15

```
slice_header( ) {                                                                   Descriptor
    slice_pic_order_cut_lsb                                                          u(v)
    ...
    if( !pic_rpl_present_flag &&( (nal_unit_type != IDR_W_RADL & &
nal_unit_type !=
            IDR_N_LP) [[ sps_idr_rpl_present_flag )) {
        for(i=0;i<2;i++){
            if( num_ref_pic_lists_in_sps[ i ]>0 && !pps_ref_pic_list_sps_idc[ i ]
&&
                (i== 0 || ( i== 1 && rpl1_idx_present_flag )))
                slice_rpl_sps_flag[ i]                                               u(1)
            if( slice_rpl_sps_flag[ i ]) {
                if( num_ref_pic_lists_in_sps[ i ]>1 &&
                    (i == 0 || ( i== 1 && rpl1_idx_present_flag)))
                    slice_rpl_idx[ i ]                                               u(v)
            } else
                ref_pic_list_struct( i, num_ref_pic_lists_in_sps[ i ] )
            for( j =0; ] < NumLtrpEntries[ i ][ RplsIdx[ i ]]; ]++){
                if( ltrp_in_slice_header_flag[ i ][ RplsIdx[ i ] ] )
                    slice_poc_lsb_lt[ i ][j]                                         u(v)
                slice_delta_poc_msb_present_flag[ i ][ j ]                           u(1)
                if( slice_delta_poc_msb present_flag[ i ][ j ])
                    slice_delta_poc_msb_cycle_lt([ i ][ j ]                          ue(v)
            }
        }
    }
    if( pic_rpl_present_flag || (( nal_unit_type != IDR_W_RADL &&
nal_unit_type !=
            IDR_N_LP) || sps_idr_rpl_present_flag )) {
        if( ( slice_type != I && num ref entries[ 0 ][ RplsIdx[ 0 ] ]> 1) ||
            ( slice_type == B && num_ref_entries[ 1 ][RplsIdx[ 1 ]]>1)){
            num_ref_idx_active_override_flag                                         u(1)
            if( num_ref_idx_active_override_flag )
                for(i=0; i <(slice_type == B?2:1); i++)
                    if( num_ref_entries[ i ][ RplsIdx[ i ]]>1)
                        num_ref_idx_active_minus1[ i]                                ue(v)
        }
    }
    if( slice_type != I) {
        if( cabac_init_present_flag )
            cabac_ init_flag                                                         u(1)
        if( pic_temporal_mvp_enabled_flag ) {
            if( slice_type == B && !pps_collocated_from_10_idc)
                collocated_from_10_flag                                              u(1)
            if( ( collocated_from_10_flag && NumRefIdxActive[ 0]>1) ||
                (!collocated from 10_flag && NumRefIdxActive[ 1 ]>1))
                collocated_ref_idx                                                   ue(v)
        }
        if( (!pic_weighted_pred_flag && slice_type == P) ||
            (pps_weighted_bipred_flag && slice_type == B))
            pred_weight_table( )
    }
}
```

Referring to Table 15, the weighted prediction-related flag (pic_weighted_pred_flag) may indicate whether the prediction weighted table syntax (information on the weighted prediction) exists in the picture header or the slice header. The value of pic_weighted_pred_flag equal to 1 may indicate that the prediction weighted table syntax (information on the weighted prediction) may exist in the picture header rather than in the slice header. The value of pic_weighted_pred_flag equal to 0 may indicate that the prediction weighted table syntax (information on the weighted prediction) may exist in the slice header rather than in the picture header. Although Table 13 and Table 14 show that the weighted prediction-related flag is signaled in the picture header, the weighted prediction-related flag may be signaled in the picture parameter set.

For example, when weighted prediction is applied to the current block, the encoding apparatus performs the weighted prediction and may encode image information including a weighted prediction-related flag and a prediction weighted table syntax based on the weighted prediction. Here, the encoding apparatus may determine the value of the flag as 1 when the prediction weighted table syntax is included in the picture header of the image information, and may determine the value of the flag as 0 when the prediction weighted table syntax is included in the slice header of the image information. When the value of the flag is 1, information on the weighted prediction included in the prediction weighted table syntax may be applied to all slices in the current picture. When the value of the flag is 0, the information on the weighted prediction included in the prediction weighted table syntax may be applied to a slice(s) associated with the slice header among the slices in the current picture. Accordingly, when the prediction weighted table syntax is included in the picture header, all slices in the picture associated with the picture header may have the same reference picture list, and when the prediction weighted table syntax is included in the slice header, the slices associated with the slice header may have the same reference picture list.

The prediction weighted table syntax may include number information on weighted reference pictures in a reference picture list of the current block, a weighting factor-related flag, and the like. As described above, the number information may refer to number information on weightings signaled for items (reference pictures) in an L0 reference picture list and/or an L1 reference picture list, and the value of the number information may be equal to the number of weighted reference pictures in the reference picture list (L0 and/or L1). Thus, when the value of the number information is n, the prediction weighted table syntax may include n weighting factor-related flags for the reference picture list. The weighting factor-related flags may correspond to luma_weight_l0_flag, luma_weight_l1_flag, chroma_weight_l0_flag, and/or chroma_weight_l0_flag of Table 11.

When weighted bi-prediction is applied to the current block, the encoding apparatus may generate a prediction weighted table syntax including number information on weighted reference pictures in the L1 reference picture list and number information on weighted reference pictures in the L0 reference picture list. The prediction weighted table syntax may include weighting factor-related flags independently for each of the number information on the weighted reference pictures in the L1 reference picture list and the number information on the weighted reference pictures in the L0 reference picture list. That is, the prediction weighed table syntax may include the same number of luma_weight_l0_flag and/or chroma_weight_l0_flag as the number of weighted reference pictures in the L0 reference picture list and may include the same number of luma_weight_l1_flags and/or chroma_weight_l1_flags as the number of weighted reference pictures in the L1 reference picture list.

When the weighted prediction-related flag is parsed from the bitstream, the decoding apparatus may parse the prediction weighted table syntax from the bitstream based on the parsed flag. The weighted prediction-related flag may be parsed from the picture parameter set and/or the picture header of the bitstream. In other words, the weighted prediction-related flag may correspond to pps_weighted_pred_flag and/or pic_weighted_pred_flag. When the value of the weighted prediction-related flag is 1, the decoding apparatus may parse the prediction weighted table syntax from the picture header of the bitstream. When the value of the weighted prediction-related flag is 0, the decoding apparatus may parse the prediction weighted table syntax from the slice header of the bitstream.

When the prediction weighted table syntax is parsed from the picture header, the decoding apparatus may apply the information on the weighted prediction included in the prediction weighted table syntax to all slices in the current picture. In other words, when the prediction weighted table syntax is parsed from the picture header, all slices in the picture associated with the picture header may have the same reference picture list. When the prediction weighted table syntax is parsed from the slice header, the decoding apparatus may apply the information on the weighted prediction included in the prediction weighted table syntax to a slice(s) associated with the slice header among the slices in the current picture. In other words, when the prediction weighted table syntax is parsed from the picture header, the slices associated with the slice header may have the same reference picture list.

The decoding apparatus may parse the number information on the weighted reference pictures in the reference picture list of the current block based on the prediction weighted table syntax. The value of the number information may be equal to the number of weighted reference pictures in the reference picture list. When weighted bi-prediction is applied to the current block, the decoding apparatus may independently parse the number information on the weighted reference pictures in the L1 reference picture list and the number information on the weighted reference pictures in the L0 reference picture list from the prediction weighted table syntax.

The decoding apparatus may parse the weighting factor-related flags for the reference picture list from the prediction weighted table syntax based on the number information. The weighting factor-related flags may correspond to luma_weight_l0_flag, luma_weight_l1_flag, chroma_weight_l0_flag, and/or chroma_weight_l0_flag described above. For example, when the value of the number information is n, the decoding apparatus may parse n weighting factor-related flags from the prediction weighted table syntax. The decoding apparatus may derive weightings for the reference pictures of the current block based on the weighting factor-related flags, and may perform inter prediction on the current block based on the weightings, thereby generating or deriving prediction samples. The decoding apparatus may generate or derive reconstructed samples for the current block based on the prediction samples, and may generate a reconstructed picture for the current picture based on the reconstructed samples.

In still another embodiment, a prediction weighted table syntax may include syntax elements shown below in Table 16, and the semantics of the syntax elements may be as shown below in Table 17.

TABLE 16

| | Descriptor |
|---|---|
| pred_weight_table() { | |
|   luma_log2_weight_denom | ue(v) |
|   if( ChromaArrayType != 0 ) | |
|     delta_chroma_log2_weight_denom | se(v) |
|   num_weighted_ref_pics_minus1 | |
|   for( i = 0; i <= num_weighted_ref_pics_minus1; i++ ) | |
|     pic_poc_abs_delta[ i ] | ue(v) |
|     if( pic_poc_abs_delta[ i ] > | |
|       pic_poc_delta_sign[ i ] | u(1) |
|     luma_weight_flag[ i] | u(1) |
|   if( ChromaArrayType != 0 ) | |
|     for( i = 0; i num_weighted_ref pics_minus1; i++ ) | |
|       chroma_weight_flag[ i ] | u(1) |
|   for( 1 = 0; i num weighted ref pics minus1; i++ ) { | |
|     if( luma_weight_flag[ i ] ) { | |
|       delta_luma_weight[ i ] | se(v) |
|       luma_offset[ i ] | se(v) |
|     } | |
|     if( chroma_weight_flag[ i ] ) | |
|       for( j = 0; j < 2; j++ ) { | |
|         delta_chroma_weight[ i ][ j ] | se(v) |
|         delta_chroma_offset[ i ][ j ] | se(v) |
|       } | |
|   } | |
| } | |

TABLE 17 luma_log2_weight_denom is the base 2 logarithm of the denominator for all luma weighting factors. The value of luma_log2 weight_denom shall be in the range of 0 to 7, inclusive.
delta_chroma_log2_weight_denom is the difference of the base 2 logarithm of the denominator for all chroma weighting factors. When delta_chroma_log2_weight_denom is not present, it is inferred to be equal to 0.

TABLE 17-continued

The variable ChromaLog2WeightDenom is derived to be equal to luma_log2_weight_denom + delta_chroma_log2_weight_denom and the value shall be in the range of 0 to 7, inclusive.
num_weighted_ref_pics_minus1 plus 1 specifies the number of reference pictures in reference pictures that are weighted. The value of num_weighted_ref_pics shall ranges from 0 to MaxDecPicBuffMinus1 + 14, inclusive.
It is a conformance constraint that the value of num_weighted_ref_pics_minus1 plus 1 shall not be less than the sum of unique active reference pictures in the reference picture lists L0 and L1 of all slices of pictures associated with the picture header containing the weighted prediction table.
pic_poc_abs_delta[ i ] specifies the absolute POC difference between the current picture and the i-th weighted reference picture.
pic_poc_delta_sign[ i ] specifies the sign of POC difference between the current picture and the i-th weighted reference picture. If pic_poc_delta_sign[ i ] is equal to 0, the corresponding pic_poc_abs_delta[ i ] has a positive value, otherwise, the corresponding pic_poc_abs_delta[ i ] has a negative value.
luma_weight_flag[ i ] equal to 1 specifies that weighting factors for the luma component in the reference picture associated with DeltaPocWeightedRefPic[ i ] are present. luma_weight_flag[ i ] equal to 0 specifies that these weighting factors are not present.
chroma_weight_flag[ i ] equal to 1 specifies that weighting factors for the chroma component in the reference picture associated with DeltaPocWeightedRefPic[ i ] are present. chroma_weight_flag[ i ] equal to 0 specifies that these weighting factors are not present. When chroma_weight_flag[ i ] is not present, it is inferred to be equal to 0.
delta_luma_weight[ i ] is the difference of the weighting factor applied to the luma prediction value for in the reference picture associated with DeltaPocWeightedRefPic[ i ].
luma_offset[ i ] is the additive offset applied to the luma prediction value for in the reference picture associated with DeltaPoc WeightedRefPic[ i ]list 0 prediction using RefPicList[ 0 ][ i ]. The value of luma_offset_l0[ i ] shall be in the range of −128 to 127, inclusive. When luma_weight_flag[ i ] is equal to 0, luma_offset[ i ] is inferred to be equal to 0.
delta_chroma_weight_l0[ i ][ j ] is the difference of the weighting factor applied to the chroma prediction values for in the reference picture associated with DeltaPocWeightedRefPic[ i ] with j equal to 0 for Cb and j equal to 1 for Cr.
delta_chroma_offset[ i ][ j ] is the difference of the additive offset applied to the chroma prediction values for in the reference picture associated with DeltaPocWeightedRefPic[ i ] with j equal to 0 for Cb and j equal to 1 for Cr.

In Table 16 and Table 17, when pic_poc_delta_sign[i] does not exist, pic_poc_delta_sign[i] is inferred as 0. DeltaPocWeightedRefPic[i] where i is included in a range from 0 to num_weighted_ref_pics_minus1 may be derived as follows.

$$DeltaPocWeightedRefPic[i] = pic\_poc\_abs\_delta[i] * (1 - 2 * pic\_poc\_delta\_sign[i])$$ [Equation 1]

ChromaWeight[i][j] may be derived as (1<<ChromaLog2WeightDenom)+delta_chroma_weight [i][j]. When the value of chroma_weight_flag[i] is 1, the value of delta_chroma_weight[i][j] is included in a range from −128 to 127. When the value of chroma_weight_flag[i] is 0, ChromaWeight[i][j] may be derived as 2ChromaLog2WeightDenom.

ChromaOffset[i][j] may be derived as follows.

$$ChromaOffset[i][j] = Clip3(-128, 127, (128 + delta\ chrome\ offset[i][j] - ((128 * ChromaWeight[i][j]) >> ChromaLog2WeightDenom)))$$ [Equation 2]

The value of delta_chroma_offset[i][j] is included in a range from −4*128 to 4*127. When the value of chroma_weight_flag[i] is 0, the value of ChromaOffset[i][j] is inferred as 9.

sumWeightFlags may be derived as the sum of luma_weight_flag [i]+2 * chroma_weight_flag [i] i is included in a range from 0 to num_weighted_ref_pics_minus1 When slice_type is P, sumWeightL0Flags is less than or equal to 24.

When a current slice is a P slice or a B slice and the value of pic_weighted_pred_flag is 1, L0ToWeightedRefIdx[i] may represent mapping between an index in a list of weighted reference pictures and an ith reference picture L0 i is included in a range from 0 to NumRefIdxActive[0]-1, and may be derived as follows.

[Equation 3]

```
for( i = 0; i < NumRefIdxActive[ 0 ]; i++ ) {
  L0ToWeightedRefIdx[ i ] = -1
```

[Equation 3]-continued

```
  for( j = 0, L0ToWeightedRefIdx[ i ] = = -1 && j <= num_weighted_ref_pics_minus1; j++ )
    if( RefPicPocList[ 0 ][ i ] = = PicOrderCntVal - DeltaPocWeightedRefPic[ j ] )
      L0ToWeightedRefIdx[ i ] = j
}
```

When the current slice is a B slice and the value of pic_weighted_pred_flag is 1, L1ToWeightedRefIdx[i] may represent mapping between an index in the list of weighted reference pictures and an ith active reference picture L1. i is included in a range from 0 to NumRefIdxActive[1]-1, and may be derived as follows.

[Equation 4]

```
for( i = 0; i < NumRefIdxActive[ 1 ]; i++ ) {
  L1ToWeightedRefIdx[ i ] = -1
  for( j = 0; L1ToWeightedRefIdx[ i ] = = -1 && j <= num_weighted_ref_pics_minus1; j++ )
    if( RefPicPocList[ 1 ][ i ] = = PicOrderCntVal - DeltaPocWeightedRefPic[ j ] )
      L1ToWeightedRefIdx[ i ] = j
}
```

When luma_weight_10_flag[i] occurs, luma_weight_10_flag[i] is replaced with luma_weight_flag[L0ToWeightedRefIdx[i]], and when luma_weight_11_flag[i] occurs, luma_weight_11_flag[i] is replaced with luma_weight_flag[L1ToWeightedRefIdx[i]].

When LumaWeightL0[i] occurs, LumaWeightL0[i] is replaced with LumaWeight[L0ToWeightedRefIdx[i]], and when LumaWeightL1[i] occurs, LumaWeightL1[i] is replaced with LumaWeight[L1ToWeightedRefIdx[i]].

When luma_offset_10[i] occurs, luma_offset_10[i] is replaced with luma_offset[L0ToWeightedRefIdx[i]], and when luma_offset_11[i] occurs, luma_offset_11[i] is replaced with luma_offset[L1ToWeightedRefIdx [i]].

When ChromaWeightL0[i] occurs, ChromaWeightL0[i] is replaced with ChromaWeight [L0ToWeightedRefIdx[i]], and when ChromaWeightL1[i] occurs, ChromaWeightL1[i] is replaced with ChromaWeight[L1ToWeightedRefIdx[i]].

In yet another embodiment, a slice header syntax may include syntax elements shown below in Table 18, and the semantics of the syntax elements may be as shown below in Table 19.

TABLE 18

| slice_header( ) { | Descriptor |
|---|---|
| ... | |
| if( ( pps_weighted_pred_flag && slice_type = = P ) \|\| | |
| ( pps_weighted_bipred_flag && slice_type = = B ) ) | |
| slice_weight_pred_present_flag | u(1) |
| if( slice_weight_pred_present_flag ) | |
| pred_weight_table( ) | |
| } | |
| ... | |
| } | |

TABLE 19 slice_weight_pred_present_flag equal to 1 specifies that weight prediction table is present in the slice header.
slice_weight_pred_present_flag equal to 0 specifies that weight prediction table is not present in the slice header.

Referring to Table 18 and Table 19, a flag indicating whether a prediction weighted table syntax exists in a slice header may be signaled. The flag may be signaled in the slice header and may be referred to as slice_weight_pred_present_flag.

The value of slice_weight_pred_present_flag equal to 1 may indicate that the prediction weighted table syntax exists in the slice header. The value of slice_weight_pred_present_flag equal to 0 may indicate that the prediction weighted table syntax does not exist in the slice header. That is, slice_weight_pred_present_flag equal to 0 may indicate that the prediction weighted table syntax exists in a picture header.

In still another embodiment, a prediction weighted table syntax is parsed from a slice header, but an adaptation parameter set including syntax elements shown below in Table 20 may be signaled.

TABLE 20

| adaptation_parameter_set_rbsp() { | Descriptor |
|---|---|
| adaptation_parameter_set id | u(5) |
| aps_params_type | u(3) |
| if( aps_params_type = = ALF_APS) | |
| alf_data() | |
| else if( aps_params_type = = LMCS_APS ) | |
| lmcs_data( ) | |
| else if( aps_params_type = = SCALING_APS ) | |
| scaling_list_data( ) | |
| else if( aps_params_type = = PRED_WEIGHT_APS ) | |
| pred_weight_data( ) | |
| aps_extension_flag | u(1) |
| if( aps_extension_flag ) | |
| while( more_rbsp_data( )) | |
| aps_extension_data_flag | u(1) |
| rbsp_trailing_bits( ) | |
| } | |

Each APS RBSP needs to be available for a decoding process before being included for reference in at least one access unit having TemporalId less than or equal to TemporalId of a coded slice NAL unit that refers to the APS RBSP or is provided through a external method.

aspLayerId may be referred to as nuh_layer_id of an APS NAL unit. When a layer with nuh_layer_id equal to aspLayerId is an independent layer (i.e., when vps_independent_layer_flag[GeneralLayerIdx[aspLayerId]] is 1), an APS NAL unit including an APS RBSP has the same nuh_layer_id as nuh_layer_id of a coded slice NAL unit referring to the APS RBSP. Otherwise, the APS NAL unit including the APS RBSP has the same nuh_layer_id as nuh_layer_id of the coded slice NAL unit referring to the APS RBSP or nuh_layer_id of a direct dependent layer of a layer including the coded slice NAL unit referring to the APS RBSP.

All APS NAL units having a specific value of adaptation_parameter_set_id and a specific value of aps_params_type in an access unit have the same content.

adaptation_parameter_set_id provides an identifier for the APS so that other syntax elements may refer to the identifier.

When aps_params_type is ALF_APS, SCALING_APS, or PRED_WEIGHT_APS, the value of adaptation_parameter_set_id is included in a range from 0 to 7.

When aps_params_type is LMCS APS, the value of adaptation_parameter_set_id is included in a range from 0 to 3.

aps_params_type indicates the type of APS parameters included in the APS as shown below in Table 21. When the value of aps_params_type is 1 (LMCS APS), the value of adaptation_parameter_set_id is included in a range from 0 to 3.

TABLE 21

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | Scaling list parameters |
| 3 | PRED_WEIGHT_APS | Prediction weighted parameters |
| 4..7 | Reserved | Reserved |

Each type of APS uses a separate value space for adaptation_parameter_set_id.

An APS NAL unit (having a specific value of adaptation_parameter_set_id and a specific value of aps_params_type) may be shared between pictures, and different slices within a picture may refer to different ALF APSs.

The value of aps_extension_flag equal to 0 indicates that an aps_extension_data_flag syntax element does not exist in the APS RBSP syntax structure. The value of aps_extension_flag equal to 1 indicates that the aps_extension_data_flag syntax element exists in the APS RBSP syntax structure.

aps_extension_data_flag may have a random value.

As described above, new aps_params_type (PRED_WEIGHT_APS) may be added to an existing type. Further, the slice header may be modified to signal the APS ID instead of pred_weight_table( ) as shown below in Table 22.

TABLE 22

| slice_header() { | Descriptor |
|---|---|
| slice_pic_parameter_set_id | ue(v) |
| ... | |
| if( ( pps_weighted_pred_flag && slice_type = = P ) \|\| | |
| ( pps_weighted_bipred_flag && slice_ type = = B ) ) | |
| slice_pred_weight_aps_id | u(3) |
| ... | |
| } | |

In Table 22, slice_pred_weight_aps_id indicates adaptation_parameter_set_id of a prediction weighted table APS. TemporalId of an APS NAL unit having the same aps_params_type as PRED_WEIGHT_APS and the same adaptation_parameter_set_id as slice_pred_weight_aps_id is less than or equal to TemporalId of the coded slice NAL unit.

When a slice_pred_weight_aps_id syntax element exists in the slice header, the value of slice_pred_weight_aps_id is the same for all slices of the picture.

In this case, a prediction weighted table syntax shown below in Table 23 may be signaled.

TABLE 23

| pred_weight_table() { | Descriptor |
|---|---|
| luma_log2_weight_denom | ue(v) |
| if( ChromaArrayType != 0) | |
| delta_chroma_log2_weight_denom | se(v) |
| num_lists_active_flag | u(1) |
| for(i=0; i < (num_lists_active_flag ? 1 : 2); i++ ) | |
| NumRefIdxActive[i] | ue(v) |
| for( i=0; i< NumRefIdxActive[ 0 ]; i++) | |
| luma_weight_l0_flag[ i ] | u(1) |
| if( ChromaArrayType != 0) | |
| for( i=0; i <NumRefIdxActive[ 0 ]; i++) | |
| chroma_weight_l0_flag[ i ] | u(1) |
| for( i=0; i< NumRefIdxActive[ 0]; i++) { | |
| if( luma_weight_l0_flag[ i]) { | |
| delta_luma_weight_l0[ i ] | se(v) |
| luma_offset_l0[ i] | se(v) |
| } | |
| if( chroma_weight_l0_flag[ i]) | |
| for(j = 0; j < 2;j++) { | |
| delta_chroma_weight_l0[ i ][ j ] | se(v) |
| delta_chroma_offset_l0[ 1 ][ j ] | se(v) |
| } | |
| } | |
| if(num_lists_active_flag) { | |
| for( i=0; i <NumRefIdxActive[ i ]; i++) | |
| luma_weight_l1_flag[ i ] | u(1) |
| if( ChromaArrayType 1= 0) | |
| for( i=0; i < NumRefIdxActive[ i ]; i++) | |
| chroma_weight_l1_flag[ i ] | u(1) |
| for( i=0; i < NumRefIdxActive[ i ]; i++){ | |
| if( luma_weight_l1_flag[ i ] ) { | |
| delta_luma_weight_l1[ i ] | se(v) |
| luma_offset_l1[ i ] | se(v) |
| } | |
| if( chroma_weight_l1_flag[ i ]) | |
| for( j=0;j< 2; j++ ) { | |
| delta_chroma_weight_l1[ i ][ j ] | se(v) |
| delta_chroma_offset_l1[ i ][ j ] | se(v) |
| } | |
| } | |
| } | |
| } | |

In Table 23, the value of num_lists_activ_flag equal to 1 may indicate that prediction weighted table information is signaled for one reference picture list. The value of num_lists_active_flag equal to 0 may indicate that prediction weight table information for two reference picture lists L0 and L1 is not signaled.

numRefIdxActive[i] may be used to indicate the number of active reference indices. The value of numRefIdxActive[i] is in a range from 0 to 14.

The syntax of Table 23 indicates whether information on one or two lists is parsed in the APS when num_lists_active_flag is parsed.

Instead of Table 23, a prediction weighted table syntax shown below in Table 24 may be used.

TABLE 24

| pred_weight_table( ) { | Descriptor |
|---|---|
| luma_log2_weight_denom | ue(v) |
| if( ChromaArrayType != 0) | |
| delta_chroma_log2_weight_denom | se(v) |
| num_lists_active_flag | u(1) |
| for( i=0; i < NumRefIdxActive[ 0 ]; i++) | |
| luma_weight_l0_flag[ i ] | u(1) |
| if( ChromaArrayType != 0) | |
| for( i=0; i < NumReffdxActive[ 0 ]; i++ ) | |
| chroma_weight_l0_flag[ i ] | u(1) |
| for( i=0; i < NumRefIdxActive[ 0 ];i++){ | |
| if( luma_weight_l0_flag[ i ]){ | |
| delta_luma_weight_l0[ i ] | se(v) |
| luma_offset_l0[ i ] | se(v) |
| } | |
| if( chroma_weight_l0_flag[ i] ) | |
| for( j=0;i<2;)++) { | |
| delta_chroma_weight_l0[ i ][ j ] | se(v) |
| delta_chroma_offset_l0[ i ][ j ] | se(v) |
| } | |
| } | |
| if(num_lists_active_flag) { | |
| for( i=0; i < NumRefIdxActive[ 1 ]; i++) | |
| luma_weight_l1_flag[ i ] | u(1) |
| if( ChromaArrayType 1= 0) | |
| for( i=0; i < NumRefIdxActive[ 1 ]; i++ ) | |
| chroma_weight_l1_flag[ i ] | u(1) |
| for( i=0; i < NumRefIdxActive[ 1 ]; i++) { | |
| if( luma_weight_l1_flag[ i ]) { | |
| delta_luma_weight_l1[ i ] | se(v) |
| luma_offset_l1[ i ] | se(v) |
| } | |
| if( chroma_weight_l1_flag[ i] ) | |
| for(j=0; j<2; j++){ | |
| delta_chroma_weight_l1[ i ][ j ] | se(v) |
| delta_chroma_offset_l1[ i ][ j ] | se(v) |
| } | |
| } | |
| } | |
| } | |

In Table 24, the value of num_lists_active_flag equal to 1 may indicate that prediction weight table information is signaled for one reference picture list. The value of num_lists_active_flag equal to 0 may indicate that prediction weight table information for two reference picture lists is not signaled.

Figure 7:
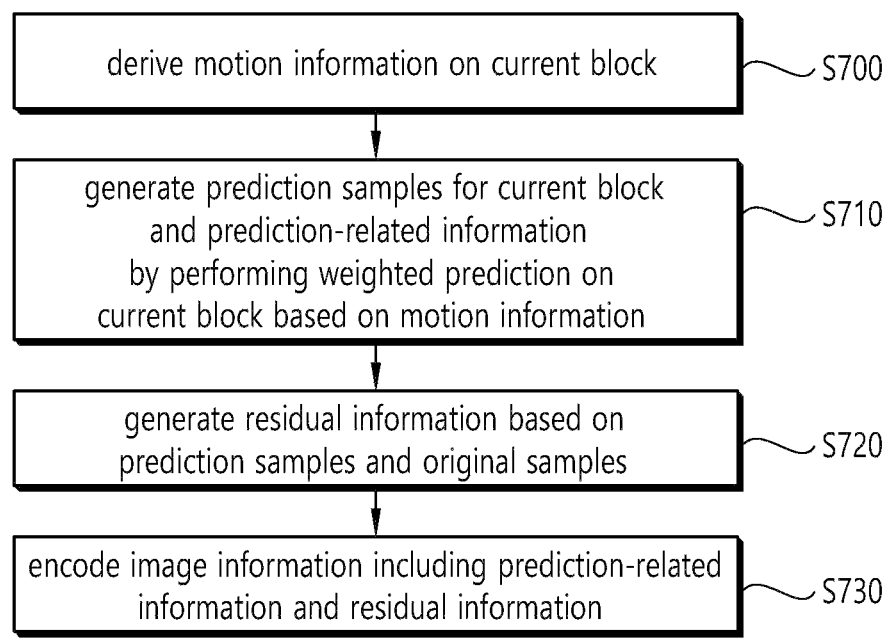
FIG. 7 and FIG. 8 schematically illustrate an example of a video/image encoding method and related components according to an embodiment of the present document.
Figure 8:
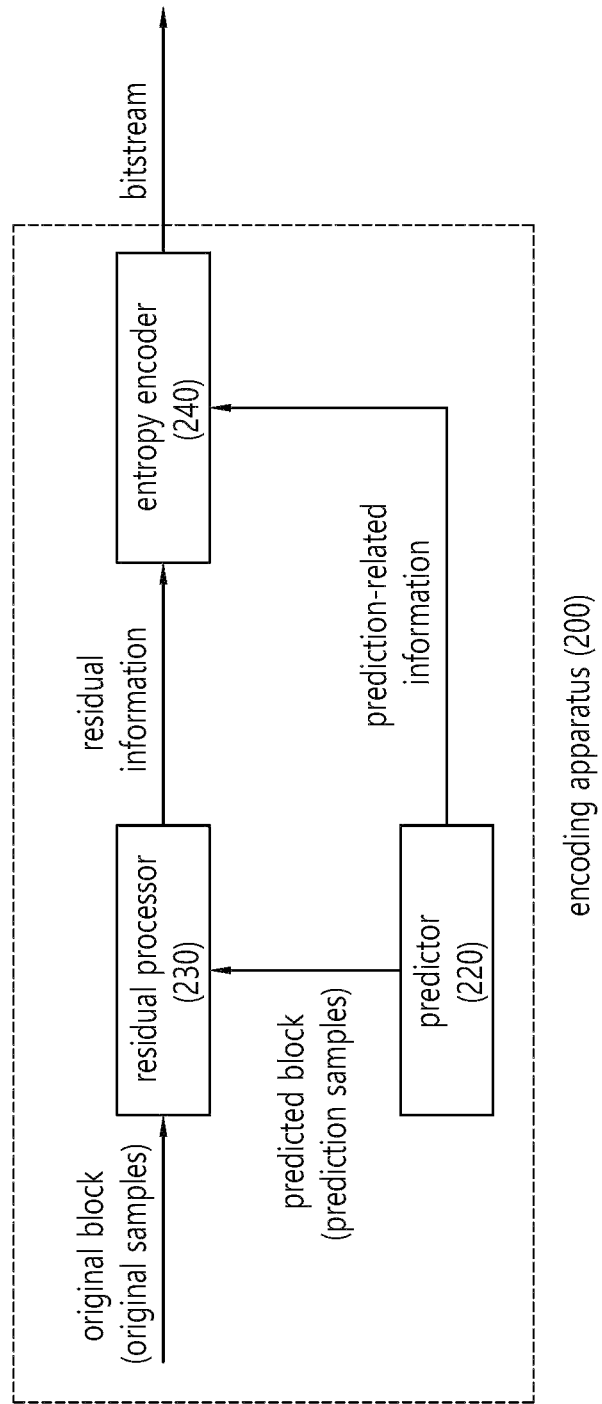

FIG. 7 and FIG. 8 schematically illustrate an example of a video/image encoding method and related components according to an embodiment of the present document.

The video/image encoding method disclosed in FIG. 7 may be performed by the (video/image) encoding apparatus 200 disclosed in FIG. 2 and FIG. 8. Specifically, for example, S700 and S710 of FIG. 7 may be performed by the predictor 220 of the encoding apparatus 200, and S720 may be performed by the residual processor 230 of the encoding apparatus 200. S730 may be performed by the entropy encoder 240 of the encoding apparatus 200. The video/image encoding method disclosed in FIG. 7 may include the embodiments described above in this document.

Specifically, referring to FIG. 7 and FIG. 8, the predictor 220 of the encoding apparatus may derive motion information on a current block in a current picture based on motion estimation (S700). For example, the encoding apparatus may search for a similar reference block having a high correlation in fractional pixel units within a predetermined search range in a reference picture using an original block in an original picture with respect to the current block, and may thus derive the motion information. Similarity of the block may be derived based on a difference between phase-based sample values. For example, the similarity of the block may be calculated based on the sum of absolute differences (SAD) between the current block (or template of the current block) and the reference block (or template of the reference block). In this case, the motion information may be derived based on a reference block having the smallest SAD in a search area. The derived motion information may be signaled to the decoding apparatus based on an inter prediction mode according to various methods.

The predictor 220 of the encoding apparatus may perform weighted (sample) prediction on the current block based on the motion information on the current block, thereby generating prediction samples (prediction block) and prediction-related information for the current block (S710). The prediction-related information may include prediction mode information (merge mode, skip mode, or the like), information on motion information, and the like. The information on the motion information may include candidate selection information (e.g., a merge index, an mvp flag, or an mvp index) that is information for deriving a motion vector. Further, the information on the motion information may include information on an MVD described above and/or reference picture index information. In addition, the information on the motion information may include information indicating whether L0 prediction, L1 prediction, or bi-prediction is applied. For example, when the slice type of a current slice is a P slice or a B slice, the predictor 220 may perform weighted prediction on the current block in the current slice. The weighted prediction may be used when not only bi-prediction but also uni-prediction is applied to the current block.

The residual processor 230 of the encoding apparatus may generate residual samples and residual information based on the prediction samples generated by the predictor 220 and the original picture (original block and original samples) (S720). Here, the residual information is information on the residual samples, and may include information on (quantized) transform coefficients for the residual samples.

The adder (or reconstructor) of the encoding apparatus may generate reconstructed samples (reconstructed picture, reconstructed block, or reconstructed sample array) by adding the residual samples generated by the residual processor 230 and the prediction samples generated by the predictor 220.

The entropy encoder 240 of the encoding apparatus may encode image information including the prediction-related information generated by the predictor 220 and the residual information generated by the residual processor 230 (S730). The prediction-related information may include information on the weighted prediction. The information on the weighted prediction may include a flag related to the weighted prediction, a prediction weighted table syntax, and the like. The prediction weighted table syntax may be included in a picture header of the image information or a slice based on the flag related to the weighted prediction.

For example, the entropy encoder 240 of the encoding apparatus may encode the image information based on at least one of Table 5 to Table 23 and may output the encoded image information in the form of a bitstream. Specifically, the entropy encoder 240 of the encoding apparatus may determine the value of the flag related to the weighted prediction as 1 based on the prediction weighted table syntax of the present document being included in a picture header of the image information, and may determine the value of the flat related to the weighted prediction as 0 based on the prediction weighted table syntax being included in a slice header of the image information. Alternatively, the entropy encoder 240 of the encoding apparatus may determine the value of the flag related to the weighted prediction as 1 based on information on the weighted prediction included in the prediction weighted table syntax being applied to all slices in the current picture including the current block, and may determine the value of the flag related to the weighted prediction as 0 based on the information on the weighted prediction included in the prediction weighted table syntax being applied to a slice associated with the slice header among the slices in the current picture. When the prediction weighted table syntax is included in the picture header, all slices associated with the picture header in the picture may have the same reference picture list, and when the prediction weighted table syntax is included in the slice header, the slices associated with the slice header may have the same reference picture list. The flag related to the weighted prediction may be included in a picture parameter set or the picture header of image information and be transmitted to the decoding apparatus. The flag related to the weighted prediction may be information indicating whether the information on the weighted prediction exists in the picture header.

The predictor 220 of the encoding apparatus may generate number information on weighted reference pictures in a reference picture list for the weighted prediction based on the weighted prediction based on the motion information. In this case, the entropy encoder 240 of the encoding apparatus may encode the image information including the information about the number. The number information may be included in the prediction weighted table syntax in the image information, and even in this case, the prediction weighted table syntax may be included in the picture header in the image information. Here, the value of the number information may be the same as the number of the weighted reference pictures in the reference picture list. The prediction weighted table syntax may include as many weighting factor-related flags as the value of the number information. The weighting factor-related flags may include a luma_weight_10_flag syntax element and/or a luma_weight_11_flag syntax element.

For example, when the value of the number information is n, the prediction weighted table syntax may include n weighting factor-related flags. When weighted bi-prediction is applied, number information and/or a weighting factor-related flag may be independently included for each of L0 and L1 in the prediction weighted table syntax. In other words, number information on weighted reference pictures in L0 and number information on weighted reference pictures in L1 may be independently signaled in the prediction weighted table syntax without depending on each other (without depending on the number of active reference pictures for each list).

Figure 9:
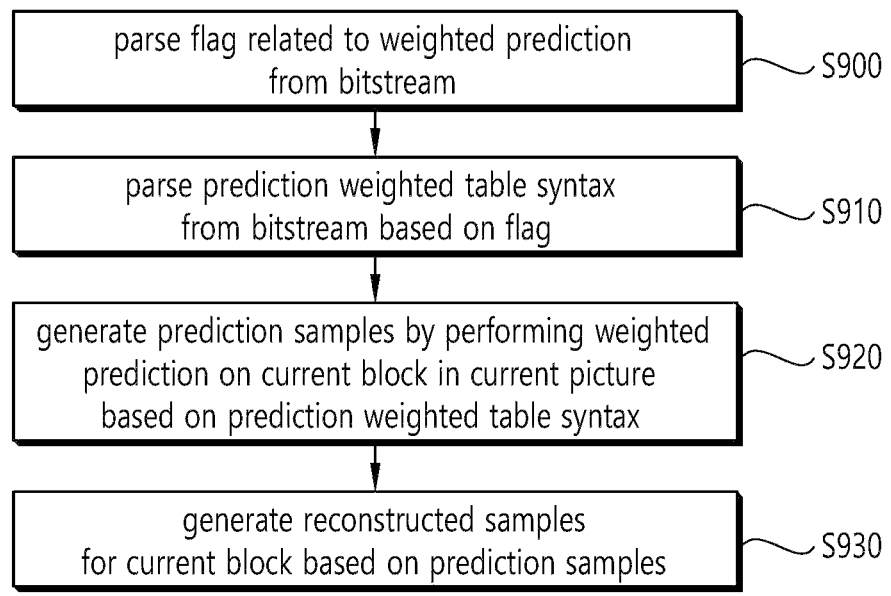
FIG. 9 and FIG. 10 schematically illustrate an example of a video/image decoding method and related components according to an embodiment of the present document.
Figure 10:
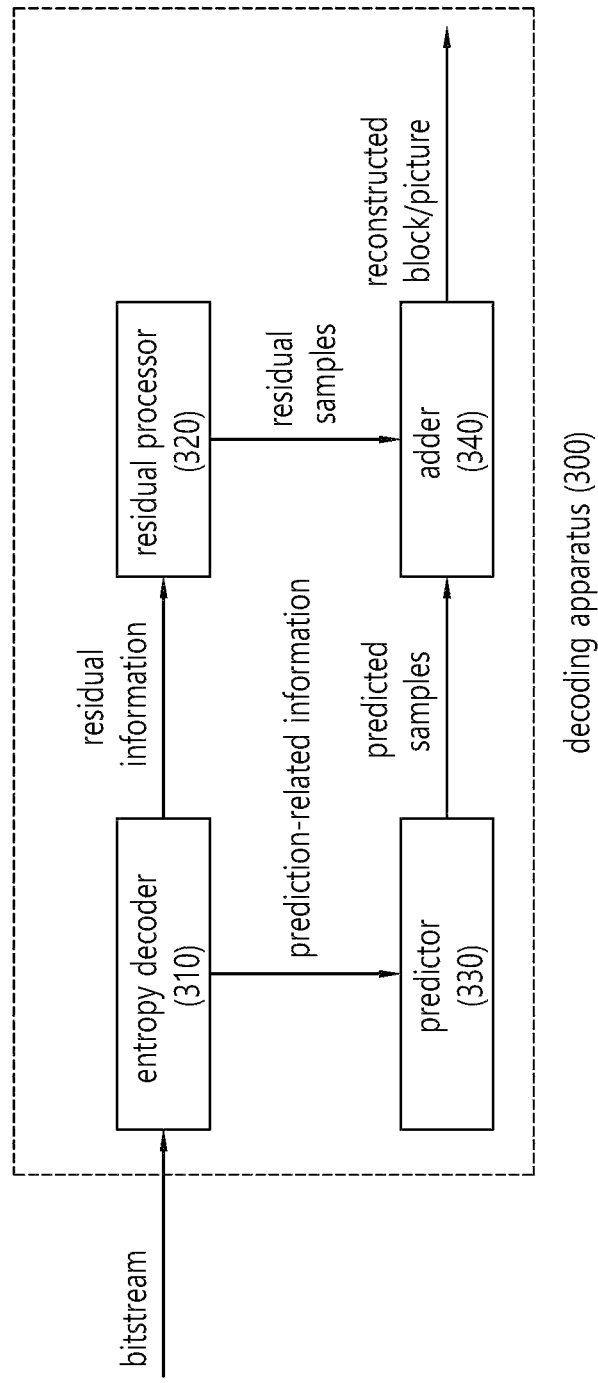

FIG. 9 and FIG. 10 schematically illustrate an example of a video/image decoding method and related components according to an embodiment of the present document.

The video/image decoding method disclosed in FIG. 9 may be performed by the (video/image) decoding apparatus 300 disclosed in FIG. 3 and FIG. 10. Specifically, for example, S900 and S910 of FIG. 9 may be performed by the entropy decoder 310 of the decoding apparatus. S920 of FIG. 9 may be performed by the predictor 330 of the decoding apparatus. S930 of FIG. 9 may be performed by the adder 340 of the decoding apparatus. The video/image decoding method disclosed in FIG. 9 may include the embodiments described above in this document.

Referring to FIG. 9 and FIG. 10, the entropy decoder 310 of the decoding apparatus may parse a flag related to weighted prediction from a bitstream (S900), and may parse a prediction weighted table syntax from the bitstream based on the flag related to the weighted prediction (S910). The flag related to the weighted prediction may be parsed from a picture parameter set or a picture header of the bitstream, and may indicate whether information on the weighted prediction (prediction weighted table syntax) exists in the picture header. The prediction weighted table syntax may be parsed from the picture header or a slice header of the bitstream based on the value of the flag related to the weighted prediction.

For example, when the value of the flag related to the weighted prediction is 1, the entropy decoder 310 of the decoding apparatus may parse the prediction weighted table syntax from the picture header of the bitstream, and when the value of the flag related to the weighted prediction is 0, the entropy decoder 310 of the decoding apparatus may parse the prediction weighted table syntax from a slice header of the bitstream. When the value of the flag related to the weighted prediction is 1, the information on the weighted prediction included in the prediction weighted table syntax may be applied to all slices in a current picture, and when the value of the flag related to the weighted prediction is 0, the information on the weighted prediction included in the prediction weighted table syntax may be applied to a slice associated with the slice header among the slices in the current picture. When the prediction weighted table syntax is parsed from the picture header, all slices associated with the picture header in the picture may have the same reference picture list, and when the prediction weighted table syntax is parsed from the slice header, the slices associated with the slice header may have the same reference picture list.

The entropy decoder 310 of the decoding apparatus may parse number information from the prediction weighted table syntax. The value of the number information may be the same as the number of weighted reference pictures in a reference picture list. The entropy decoder 310 of the decoding apparatus may parse as many weighting factor-related flags as the value of the number information. For example, when the value of the number information is n, the prediction weighted table syntax may include n weighting factor-related flags. When weighted bi-prediction is applied, number information and/or a weighting factor-related flag may be independently included for each of L0 and L1 in the prediction weighted table syntax. In one example, number information on weighted reference pictures in L0 and number information on weighted reference pictures in L1 may be independently parsed in the prediction weighted table syntax without depending on each other (without depending on the number of active reference pictures for each list).

The predictor 330 of the decoding apparatus may perform weighted prediction on a current block in the current picture based on prediction-related information (inter/intra prediction classification information, intra prediction mode information, inter prediction mode information, the information on the weighted prediction, or the like) obtained from the bitstream, thereby generating prediction samples (S920). Here, the information on the weighted prediction may include the prediction weighted table syntax. For example, the predictor 330 of the decoding apparatus may derive weightings for the weighted prediction based on the weighting factor-related flags parsed based on the number information in the prediction weighted table syntax. Specifically, the value of the number information in the prediction weighted table syntax is n, the predictor 330 of the decoding apparatus may parse n weighting factor-related flags from the prediction weighted table syntax. The predictor 330 of the decoding apparatus may perform the weighted prediction on the current block based on the weightings, thereby deriving the prediction samples for the current block.

The residual processor 320 of the decoding apparatus may generate residual samples based on residual information obtained from the bitstream. The adder 340 of the decoding apparatus may generate reconstructed samples based on the prediction samples generated by the prediction unit 330 and the residual samples generated by the residual processor 320 (S930). The adder 340 of the decoding apparatus may generate a reconstructed picture (reconstructed block) based on the reconstructed samples.

Subsequently, if necessary, an in-loop filtering procedure, such as deblocking filtering, SAO, and/or ALF, may be applied to the reconstructed picture in order to improve subjective/objective picture quality.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present document.

The aforementioned method according to the present document may be in the form of software, and the encoding apparatus and/or decoding apparatus according to the present document may be included in a device for performing image processing, for example, a TV, a computer, a smart phone, a set-top box, a display device, or the like.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Blu-ray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 11:
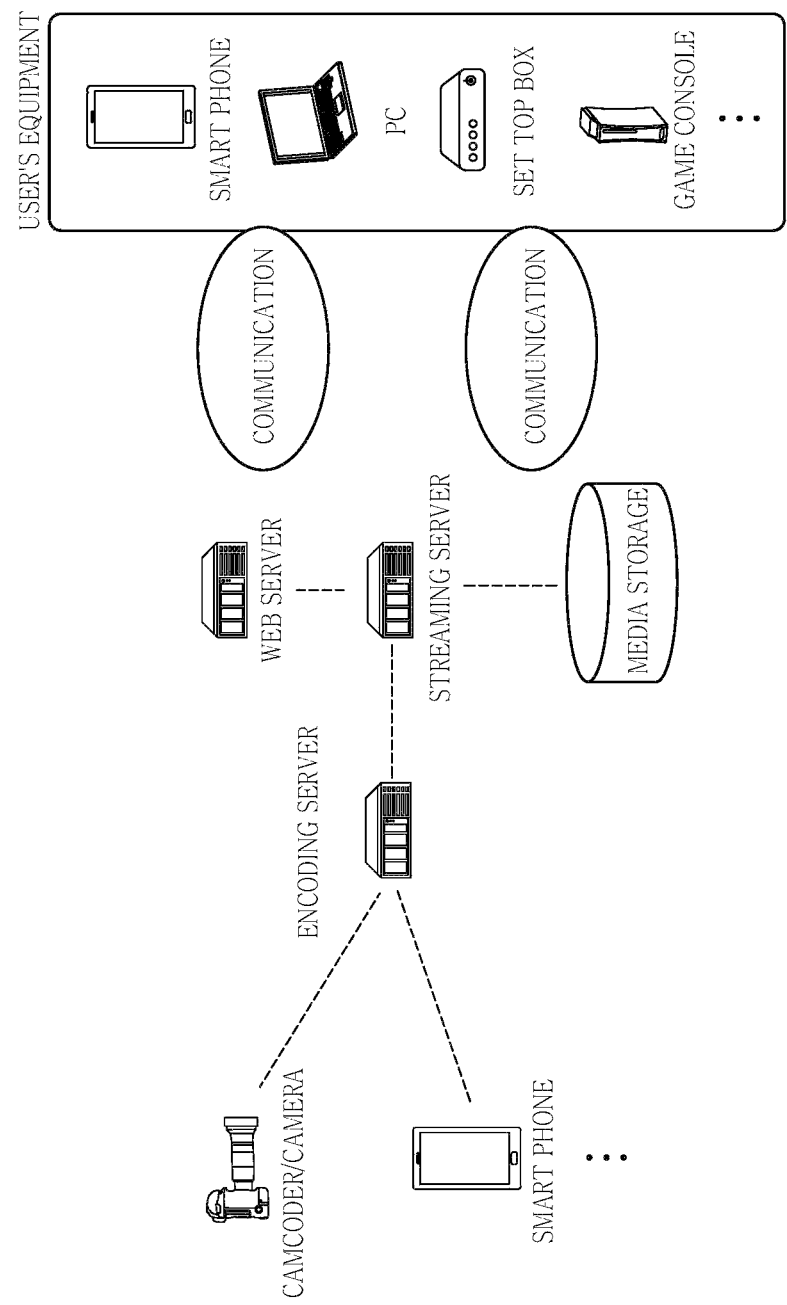
FIG. 11 illustrates an example of a content streaming system to which embodiments disclosed in the present document are applicable.

FIG. 11 represents an example of a contents streaming system to which the embodiment of the present document may be applied.

Referring to FIG. 11, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. In another example, in a case in which the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. A decoding apparatus for an image decoding, the decoding apparatus comprising:
a memory; and
at least one processor connected to the memory, the at least one processor configured to:
parse a flag related to weighted prediction from a bitstream;
parse a prediction weighted table syntax from the bitstream based on the flag;
generate prediction samples by performing weighted prediction on a current block in a current picture based on the prediction weighted table syntax; and
generate reconstructed samples for the current block based on the prediction samples,
wherein the prediction weighted table syntax is parsed from a picture header of the bitstream based on a value of the flag, and
wherein the picture header includes information which applies to all slices in a picture related to the picture header.

2. An encoding apparatus for an image encoding, the encoding apparatus comprising:
a memory; and
at least one processor connected to the memory, the at least one processor configured to:
derive motion information on a current block;
generate prediction samples for the current block and prediction-related information by performing weighted prediction on the current block based on the motion information;
generate residual information based on the prediction samples and original samples; and
encode image information comprising the prediction-related information and the residual information,
wherein the prediction-related information comprises a flag related to the weighted prediction and a prediction weighted table syntax,
wherein the prediction weighted table syntax is comprised in a picture header of the image information based on a value of the flag, and
wherein the picture header includes information which applies to all slices in a picture related to the picture header.

3. An apparatus for transmitting data for an image, the apparatus comprising:
- at least one processer configured to obtain a bitstream for the image, wherein the bitstream is generated based on deriving motion information on a current block, generating prediction samples for the current block and prediction-related information by performing weighted prediction on the current block based on the motion information, generating residual information based on the prediction samples and original samples, and encoding image information to generate the bitstream, wherein the image information comprises the prediction-related information and the residual information; and
- a transmitter configured to transmit the data comprising the bitstream,
- wherein the prediction-related information comprises a flag related to the weighted prediction and a prediction weighted table syntax,
- wherein the prediction weighted table syntax is comprised in a picture header of the image information based on a value of the flag, and
- wherein the picture header includes information which applies to all slices in a picture related to the picture header.

* * * * *